(12) United States Patent
Skroski et al.

(10) Patent No.: US 11,817,567 B2
(45) Date of Patent: Nov. 14, 2023

(54) SYSTEM FOR BATTERY TEMPERATURE MANAGEMENT IN AN ELECTRIC AIRCRAFT

(71) Applicant: BETA AIR, LLC, South Burlington, VT (US)

(72) Inventors: Tyler John Skroski, South Burlington, VT (US); Stuart Denson Schreiber, Essex, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/563,383

(22) Filed: Dec. 28, 2021

(65) Prior Publication Data

US 2023/0207922 A1   Jun. 29, 2023

(51) Int. Cl.
*B60L 58/26* (2019.01)
*B60L 58/27* (2019.01)
(Continued)

(52) U.S. Cl.
CPC .......... *H01M 10/635* (2015.04); *B60L 50/60* (2019.02); *B60L 58/12* (2019.02); *B60L 58/24* (2019.02);
(Continued)

(58) Field of Classification Search
CPC ............. H01M 10/613; H01M 10/615; H01M 10/617; H01M 10/625; H01M 10/635;
(Continued)

(56) References Cited

U.S. PATENT DOCUMENTS 9,812,744 B2    11/2017  Yamamoto et al.
10,604,028 B1 *  3/2020  Muniz ..................... B60L 58/26
(Continued)

FOREIGN PATENT DOCUMENTS

WO        2021064382 A2    4/2021
WO    WO-2021064397 A2 *  4/2021   ................ B60L 1/02

OTHER PUBLICATIONS

Prachi Patel, The Battery Design Smarts Behind Rolls Royce's Ultrafast Electric Airplane, Jan. 28, 2021.
(Continued)

*Primary Examiner* — Jonathan G Jelsma
(74) *Attorney, Agent, or Firm* — CALDWELL INTELLECTUAL PROPERTY LAW

(57) ABSTRACT

In an aspect, a system for battery temperature management in an electric aircraft. In some embodiments, the system includes a plurality of battery cells, comprised of pouch cells. The system includes at least a sensor communicatively connected to a computing device. At least a sensor may be configured to detect temperature. A system also includes a plurality of temperature regulating elements disposed between the plurality of pouch cells. A temperature regulating elements are configured to maintain the temperature of the battery pack. The system also includes a computing device communicatively connected to the plurality of temperature regulating elements. A computing device is configured to determine a target temperature of the plurality of cells and direct the plurality of temperature regulating elements to modify a temperature of the plurality of battery cells as a function of the target temperature.

15 Claims, 8 Drawing Sheets

(51) Int. Cl.
| | |
|---|---|
| *B60L 58/12* | (2019.01) |
| *H01M 10/613* | (2014.01) |
| *H01M 10/615* | (2014.01) |
| *H01M 10/658* | (2014.01) |
| *H01M 10/635* | (2014.01) |
| *B60L 58/24* | (2019.01) |
| *B60L 50/60* | (2019.01) |
| *H01M 10/48* | (2006.01) |
| *H01M 10/653* | (2014.01) |
| *H01M 10/6571* | (2014.01) |
| *B64D 27/24* | (2006.01) |

(52) U.S. Cl.
CPC ............... *B60L 58/26* (2019.02); *B60L 58/27* (2019.02); *B64D 27/24* (2013.01); *H01M 10/486* (2013.01); *H01M 10/613* (2015.04); *H01M 10/615* (2015.04); *H01M 10/653* (2015.04); *H01M 10/658* (2015.04); *H01M 10/6571* (2015.04); *B60L 2200/10* (2013.01); *H01M 2220/20* (2013.01)

(58) Field of Classification Search
CPC .......... H01M 10/647; H01M 10/6555; H01M 10/6557; H01M 2220/20; B60L 58/12; B60L 58/24; B60L 58/26; B60L 58/27
See application file for complete search history.

(56) References Cited

U.S. PATENT DOCUMENTS

| | | |
|---|---|---|
| 10,727,551 B2 | 7/2020 | Muniz et al. |
| 10,777,862 B2 | 9/2020 | Jeon et al. |
| 10,960,785 B2 | 3/2021 | Villanueva et al. |
| 2007/0212597 A1* | 9/2007 | Herlinger ............ H01M 10/623 219/494 |
| 2015/0096300 A1* | 4/2015 | Gurin ..................... F01K 23/04 60/668 |
| 2015/0202980 A1* | 7/2015 | Hanna ..................... B60L 58/27 701/22 |
| 2019/0003904 A1 | 1/2019 | Fagart et al. |
| 2019/0252744 A1 | 8/2019 | Zimmermann et al. |
| 2020/0136204 A1 | 4/2020 | Pilawa et al. |
| 2020/0313249 A1 | 10/2020 | Zhao |
| 2020/0343611 A1 | 10/2020 | Shimizu |
| 2020/0371165 A1* | 11/2020 | Schweitzer ............ G01N 29/12 |
| 2021/0104789 A1 | 4/2021 | Wu et al. |
| 2021/0143492 A1* | 5/2021 | Zagrodnik ............. B60L 58/27 |

OTHER PUBLICATIONS

Pipistrel Aircraft, Batteries Systems and BMS—Pipistrel Aircraft, Sep. 17, 2021.
Hagen Kellermann, Design of a Battery Cooling System for Hybrid Electric Aircraft, Jul. 28, 2021.
Chong Zhu, A Compact Onboard Battery Self-Heater for All-Electric Aircraft Applications at Cold Climates, Jul. 15, 2019.
Thermo, Battery Thermal Management, Sep. 17, 2021.

* cited by examiner

SYSTEM FOR BATTERY TEMPERATURE MANAGEMENT IN AN ELECTRIC AIRCRAFT

FIELD OF THE INVENTION

The present invention generally relates to the field of electric vehicle chargers. In particular, the present invention is directed to a system for battery temperature management in an electric aircraft.

BACKGROUND

Electric vehicles typically derive their operational power from onboard rechargeable batteries. However, it can be a complex task to regulate the temperature of these batteries in a safe manner.

SUMMARY OF THE DISCLOSURE

In an aspect to a system for battery temperature management in an electric aircraft is provided. The system includes a plurality of battery cells, wherein the battery cells are comprised of pouch cells and at least a sensor that is communicatively connected to a computing device. At least a sensor may be configured to detect temperature. A system includes a plurality of temperature regulating elements disposed between the plurality of pouch cells. A temperature regulating elements are configured to maintain the temperature of the battery packs. The system also includes a computing device communicatively connected with the plurality of temperature regulating elements. The computing device is configured to determine a target temperature of the plurality of cells and direct the plurality of temperature regulating elements to modify the temperature of the plurality of cells as a function of the target temperature.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for battery temperature management in an electric aircraft. Aspects of the present disclosure can be used to maintain the target temperature of the battery. This is so, at least in part, because temperature regulating devices are used to either heat or cool the battery when the target temperature is not met. Exemplary embodiments illustrating aspects of the present disclosure are described below in the context of several specific examples.

Figure 1:
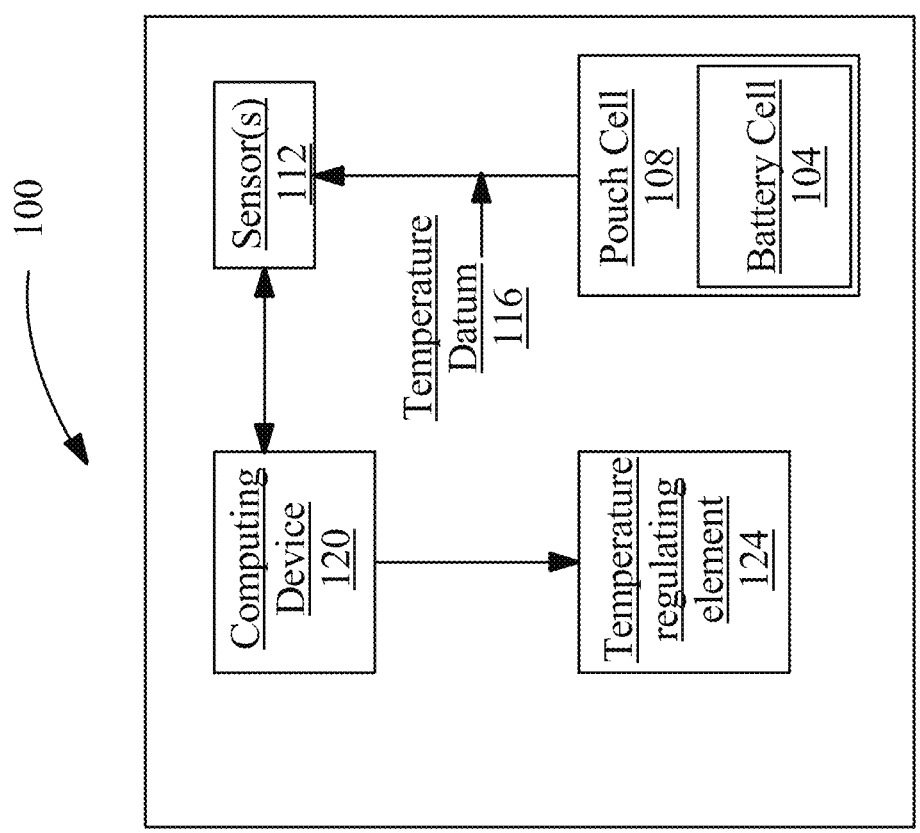
FIG. 1 is a block diagram of an exemplary system for battery temperature management in an electric aircraft.

Referring now to FIG. 1, system 100 illustrates a block diagram of an exemplary embodiment of a system for battery temperature management in an electric aircraft. System 100 may include at least a battery cell 104. A battery may include, without limitation, one or more cells, in which chemical energy is converted into electricity (or electrical energy) and used as a source of energy or power. As used in this disclosure, a "battery module" is a set of any number of identical (or non-identical) batteries or individual battery cells 104. These may be configured in a series, parallel or a mixture of both configurations to deliver a desired electrical flow, current, voltage, capacity, or power density, as needed or desired.

With continued reference to FIG. 1, the term 'battery' is used as a collection of cells connected in series or parallel to each other. A battery cell 104 may, when used in conjunction with other cells, may be electrically connected in series, in parallel or a combination of series and parallel. Series connection comprises wiring a first terminal of a first cell to a second terminal of a second cell and further configured to comprise a single conductive path for electricity to flow while maintaining the same current (measured in Amperes) through any component in the circuit. A battery cell 104 may use the term 'wired', but one of ordinary skill in the art would appreciate that this term is synonymous with 'electrically connected', and that there are many ways to couple electrical elements like battery cells 104 together. An example of a connector that do not comprise wires may be prefabricated terminals of a first gender that mate with a second terminal with a second gender. Battery cells 104 may be wired in parallel. Parallel connection comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 104 may be wired in a series-parallel circuit which combines characteristics of the constituent circuit types to this combination circuit. Battery cells 104 may be electrically connected in a virtually unlimited arrangement which may confer onto the system the electrical advantages associated with that arrangement such as high-voltage applications, high-current applications, or the like. In an exemplary embodiment, Battery module 104 comprise 196 battery cells in series and 18 battery cells in parallel. This is, as someone of ordinary skill in the art would appreciate, is only an example and Battery module 104 may be configured to have a near limitless arrangement of battery cell configurations.

With continued reference to FIG. 1, a plurality of battery modules 104 may also comprise a side wall which comprises a laminate of a plurality of layers configured to thermally insulate the plurality of battery cells 104 from external components of battery module 104. Side wall layers may comprise materials which possess characteristics suitable for thermal insulation as described in the entirety of this disclosure like fiberglass, air, iron fibers, polystyrene foam, and thin plastic films, to name a few. Side wall may additionally or alternatively electrically insulate the plurality of battery cells 104 from external components of battery module and the layers of which may comprise polyvinyl chloride (PVC), glass, asbestos, rigid laminate, varnish, resin, paper, Teflon, rubber, and mechanical lamina. Center sheet may be mechanically coupled to side wall in any manner described in the entirety of this disclosure or otherwise undisclosed methods, alone or in combination. Side wall may comprise a feature for alignment and coupling to center sheet. This feature may comprise a cutout, slots, holes, bosses, ridges, channels, and/or other undisclosed mechanical features, alone or in combination. Plurality of battery module may be a combination of a plurality of battery module 104 utilized to power the electric aircraft. Battery module may include any of the batteries described in U.S. Nonprovisional application Ser. No. 16/948,140, filed on Sep. 4, 2020, and entitled "SYSTEM AND METHOD FOR HIGH ENERGY DENSITY BATTERY MODULE", the entirety of which is incorporated herein by reference.

With continued reference to FIG. 1, method 100 includes a pouch cell 108 within the battery cells 104. As used in this disclosure, "pouch cell" is a battery cell or module that includes a pouch. In some cases, a pouch cell 108 may include or be referred to as a prismatic pouch cell 108, for example when an overall shape of pouch may be prismatic. In some cases, a pouch cell 108 may include a pouch, which is further described herein with reference to FIG. 4. Pouch cell 108 may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Pouch cell 108 may include lead-based batteries such as without limitation lead acid batteries and lead carbon batteries. Pouch cell 108 may include lithium sulfur batteries, magnesium ion batteries, and/or sodium ion batteries. Pouch cell 108 may include solid state batteries or supercapacitors or another suitable energy source. In other embodiments, the pouch cell may be a prismatic, cylindrical, or other type of battery cell. In some embodiments, the pouch cell may be a lithium-ion battery. In some embodiments, the lithium-ion battery may include lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO). Persons skilled in the art, upon reviewing the entirety of this disclosure, will be aware of various devices of components that may be used as a pouch cell.

With continued reference to FIG. 1, in some embodiments, at least a sensor 112 is configured to detect collect temperature datum 116 from the battery. For the purposes of this disclosure, "temperature datum" is an electronic signal representing an information and/or a parameter of a detected electrical and/or physical characteristic and/or phenomenon correlated with the temperature within the battery. Temperature datum may also include a measurement of resistance, current, voltage, moisture, and the current temperature of the battery. Temperature datum 116 may also include information regarding the degradation or failure of the battery cell.

Still referring to FIG. 1, as used in this disclosure, a "sensor" is a device that is configured to detect a phenomenon and transmit information related to the detection of the phenomenon. For example, in some cases a sensor may transduce a detected phenomenon, such as without limitation, voltage, current, speed, direction, force, torque, resistance, moisture, temperature, pressure, and the like, into a sensed signal. Sensor may include one or more sensors which may be the same, similar or different. Sensor may include a plurality of sensors which may be the same, similar or different. Sensor may include one or more sensor suites with sensors in each sensor suite being the same, similar or different.

Still referring to FIG. 1, sensor(s) 112 may include any number of suitable sensors which may be efficaciously used to detect temperature datum 116. For example, and without limitation, these sensors may include a voltage sensor, current sensor, multimeter, voltmeter, ammeter, electrical current sensor, resistance sensor, impedance sensor, capacitance sensor, a Wheatstone bridge, displacements sensor, vibration sensor, Daly detector, electroscope, electron multiplier, Faraday cup, galvanometer, Hall effect sensor, Hall probe, magnetic sensor, optical sensor, magnetometer, magnetoresistance sensor, MEMS magnetic field sensor, metal detector, planar Hall sensor, thermal sensor, and the like, among others. Sensor(s) 112 may efficaciously include, without limitation, any of the sensors disclosed in the entirety of the present disclosure.

With continued reference to FIG. 1, in some embodiments of system 100, sensor 112 may be communicatively connected with a computing device 120. Sensor 112 may communicate with computing device 120 using an electric connection. Alternatively, sensor 112 may communicate with computing device 120 wirelessly, such as by radio waves, Bluetooth, or Wi-Fi. One of ordinary skill in the art, upon reviewing the entirety of this disclosure, would recognize that a variety of wireless communication technologies are suitable for this application.

With continued reference to FIG. 1, computing device 120 may be communicatively connected with temperature regulating elements 116. Computing device 120 may be configured to receive temperature datum 124 from sensor 112. High/low temperature within the battery cell may be determined by the computing device 120 as a function of the temperature datum 124. Additionally, the computing device may determine high/low temperature within the battery cells by comparing temperature datum 124 to a predetermined value. When computing device 120 receives temperature datum 124 from sensor 112 that indicates high/low temperature within the battery cells, then computing device 120 may send a may send a notification to a user interface signifying that high/low temperature within the battery cells.

With continued reference to FIG. 1, an exemplary embodiment of a system 100 for a system for battery temperature management in an electric aircraft is illustrated. System includes a computing device 120. Computing device 120 may include any computing device as described in this disclosure, including without limitation a microcontroller, microprocessor, digital signal processor (DSP) and/or system on a chip (SoC) as described in this disclosure. Computing device 120 may include, be included in, and/or communicate with a mobile device such as a mobile telephone or smartphone. Computing device 120 may include a single computing device operating independently, or may include two or more computing device operating in concert, in parallel, sequentially or the like; two or more computing devices may be included together in a single computing device or in two or more computing devices. Computing device 120 may interface or communicate with one or more additional devices as described below in further detail via a network interface device. Network interface device may be utilized for connecting computing device to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 120 may include but is not limited to, for example, a computing device or cluster of computing devices in a first location and a second computing device or cluster of computing devices in a second location. Computing device 120 may include one or more computing devices dedicated to data storage, security, distribution of traffic for load balancing, and the like. computing device may distribute one or more computing tasks as described below across a plurality of computing devices of computing device, which may operate in parallel, in series, redundantly, or in any other manner used for distribution of tasks or memory between computing devices. computing device may be implemented using a "shared nothing" architecture in which data is cached at the worker, in an embodiment, this may enable scalability of system 100 and/or computing device.

With continued reference to FIG. 1, computing device 120 may be designed and/or configured to perform any method, method step, or sequence of method steps in any embodiment described in this disclosure, in any order and with any degree of repetition. For instance, computing device 120 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 120 may be configured to determine the target temperature of the battery. As used in this disclosure, "target temperature" is an ideal or otherwise preset temperature of a battery; target temperature may be calculated based on a culmination one or more factors such as weather, flight mode, altitude, external temperature and the like. In some embodiments, computing device 120 may be configured to generate target temperature as a function of the flight plan. As used in the current disclosure, a "flight plan" is a plan to get the aircraft from its departure point to it arrival point in the most efficient manner with respect to flight duration, payload size, aircraft identity, and the like. In a non-limiting, example the target temperature of the battery may adjust based on the duration of the flight or the payload size. Target temperature may allow for a larger or smaller range of temperature for flights that are more strenuous on the battery according to the flight plan.

With continued reference to FIG. 1, computing device 120 may be configured to determine the target temperature of the battery as a function of battery considerations. Battery considerations may include status of charge of the battery, the number of battery modules, and overall battery health. In embodiments, a computing device may calculate target temperature as a function of a location of a charging station as it relates to of a current charge of the battery. In other embodiments, a target temperature of a battery may be calculated based on health of the battery adjusting for suboptimal battery health. Target temperature may also be calculated based on a number of battery modules adjusting for heat each battery produces.

With continued reference to FIG. 1, temperature regulating elements 124 may be configured regulate the temperature of the battery cells. As used in the current disclosure, "regulating the temperature" means managing increase or decrease of the temperature of the battery. Temperature regulation also includes getting to and then maintaining a target temperature. Sensor feedback may be used in this process, whereas the sensor is used as a thermostat.

With continued reference to FIG. 1, computing device 120 may be configured to determine the target temperature of the battery as a function of the weather. As used in this disclosure, "weather" is defined as the state of the atmosphere at a place and time as regards temperature, coolness, heat, dryness, sunshine, wind, snow, hail, rain, and the like. Weather may also include but is not limited to ambient temperature, average temperature at different altitudes, wind speed, humidity, etc. As used in the current disclosure, "weather datum' is the datum that is used to calculate the weather at a given time such as wind speed, humidity, temperature at a given altitude, temperature on the ground, and the like. In some embodiments, weather maybe calculated outside the system then communicated to computing device 120. In some embodiments, weather datum bay be transmitted to computing device by a remote device. In other embodiments, computing device 120 derives the weather as a function of the weather datum. Weather datum may be detected through the use of one or more sensors communicatively connected to a computing device. The various weather events may cause the battery temperature to heat or cool accordingly. Changes in a target temperature may reflect the changes in the weather in order to maintain the ideal temperature of the battery.

With continued reference to FIG. 1, computing device 120 may be configured to calculate the target temperature of the battery as a function of the weather using an equation. As used in the current disclosure, an "equation" is a mathematical formula that will take into account at least the current temperature of the battery and the weather to output the target temperature of the battery. In some embodiments.

With continued reference to FIG. 1, computing device 120 may be configured to calculate the target temperature of the battery as a function of the weather using a machine learning process. Machine-learning module may perform determinations, classification, and/or analysis steps, methods, processes, or the like as described in this disclosure using machine learning processes. A "machine learning process," as used in this disclosure, is a process that automatedly uses training data to generate an algorithm that will be performed by a computing device/module to produce a preflight battery temperature given data provided as inputs. As used in the current disclosure, "training data," as used herein, is data containing correlations that a machine-learning process may use to model relationships between two or more categories of data. In some embodiments, the inputs into the machine learning process are weather datum and the output of the process the target temperature of the battery. In a non-limiting example, training data that may be correlated include destinations, weather datum, flight plan data, weather, and the like. In some embodiments, training data may include recorded previous flights where batteries acted within an optimal range, did not require modifications to the flight plan due to temperature issues, and did not exceed or drop below a desired temperature range. In some embodiments, training data may be generated via electronic communication between a computing device and plurality of sensors. In other embodiments, training data may be communicated to a machine learning model from a remote device. Once the flight plan machine learning process receives training data, it may be implemented in any manner suitable for generation of receipt, implementation, or generation of machine learning.

With continued reference to FIG. 1, computing device 120 may be configured to calculate the target temperature of the battery as a function of the weather using a database. Database may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure. In some embodiments, weather datum may be used a query to retrieve the target temperature of the battery.

With continued reference to FIG. 1, computing device 120 may be configured to command the temperature regulating elements 124 to maintain the temperature of the plurality of battery cells. In embodiments, computing device 120 will be communicatively connected with temperature regulating elements. Computing device 120 may command the temperature regulating elements to heat or cool the battery as needed as a function of the target temperature with the goal of maintaining the target temperature of the battery.

With continued reference to FIG. 1, system 100 may include a plurality temperature regulating element 124. As used in the current disclosure a "temperature regulating element" is any device configured to maintain the target temperature of the battery through the use of heating and/or cooling elements. In a non-limiting embodiment, a temperature regulating element 124 may be one or any combination of include heat exchangers, heaters, coolers, air conditioners, sheet heaters, and the like. In other embodiments, materials with high or low thermal conductivity, insulators, and convective fluid flows may be used to regulate the temperature of the battery. In a nonlimiting example, temperature regulating elements 120 may be located in gaps between the battery cells.

With continued reference to FIG. 1, temperature regulating element 124 may include a heating element. As used in the current disclosure, a "heating element" is a device used to raise the temperature of the battery. In a non-limiting example, heating elements may include sheet heaters, heat exchangers, heaters, and the like. As used in the current disclosure, a "sheet heaters" may include any heating element that is thin and flexible such as to be wrapped around a battery cell, inserted between two battery cells, or the like. Examples of sheet heaters include but are not limited to thick film heaters, sheets of resistive heaters, a heating pad, heating film. heating blanket, and the like. In embodiments, sheet heaters may be wrapped around a battery cell. Sheet heaters may also be placed in the gaps between the battery cells.

Figure 2:
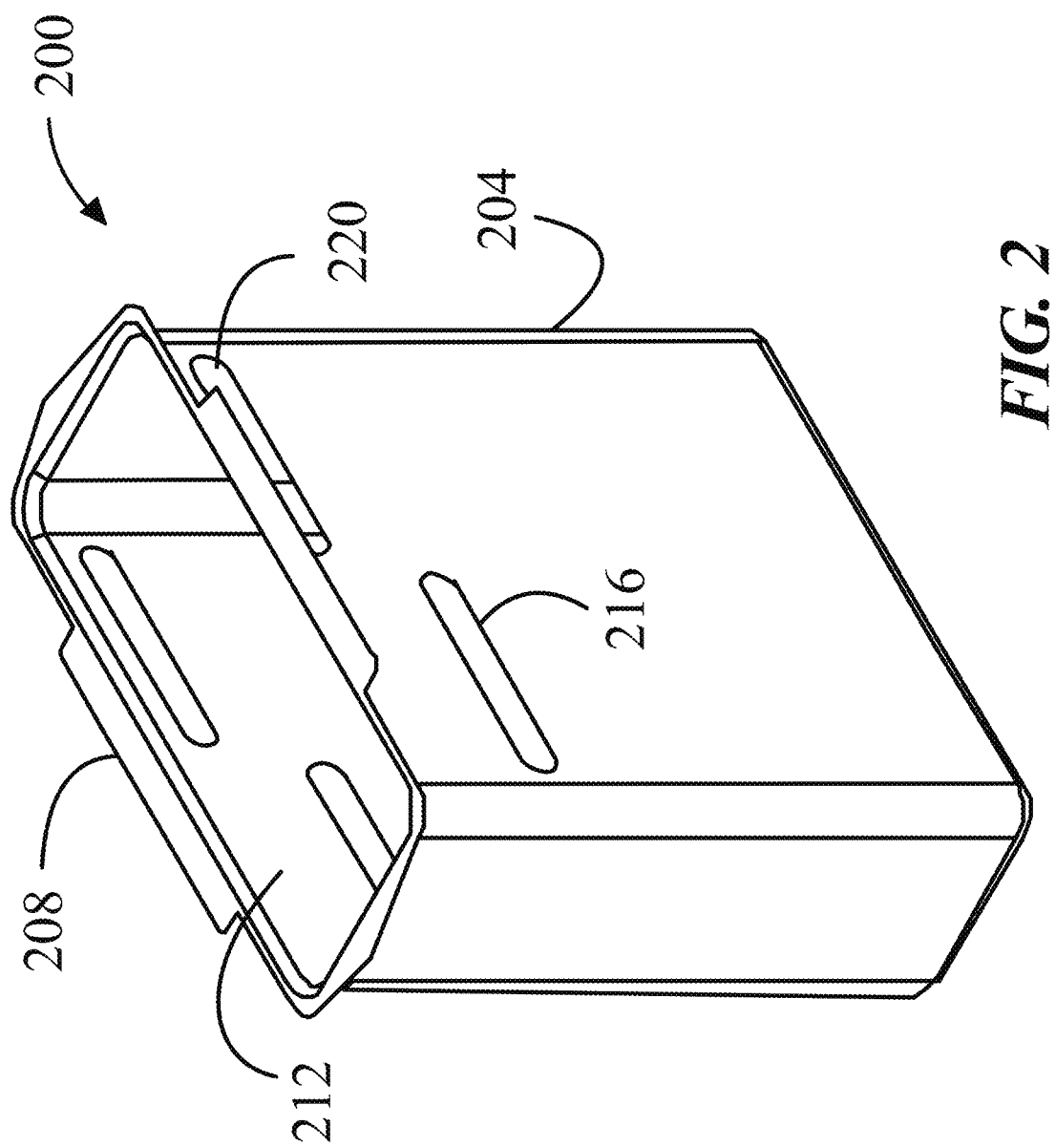
FIG. 2 is a diagrammatic representation of an exemplary embodiment of the case.

Now, referring to FIG. 2, system 200 illustrates a diagrammatic representation of an exemplary embodiment of the case. The system includes exterior surface 204 of the case, interior surface 208, opening 212, lip 216, and hole 220. In this embodiment, the term "case" refers to a container designed to hold or protect something; in this case, the case is holding and protecting the plurality of battery cells, which is described further herein with reference to FIG. 3. In some cases, case 200 may be made from metal for example one or more of sheet metal, stamped metal, extruded metal, and/or machined metal. In some cases, case 200 may be formed by way of welding, brazing, and/or soldering. In some cases, case 200 may be composed wholly or in part of a relatively light and strong metal, such as without limitation aluminum alloy. As shown in FIG. 1, case 200, may include an exterior surface 204 and interior surface 208 that are curated from different materials, and are explained further below. In some versions, case may provide a firewall between flammable battery modules within the battery and an environment or vehicle surrounding the battery.

Still referring to FIG. 2, case 200 includes an exterior surface 204. In this disclosure, "exterior surface" is the surface on the outside of the case that protects the layers of battery cells on the inside. Exterior surface 204 may be made from any of the materials above. A possible material the exterior surface may be composed of, without limitation, is nickel-coated steel; this material works well with lithium-ion batteries due to the corrosion protection and chemical resistance provided by the nickel. Additionally, exterior surface 204 may not be thermally conductive so it may contain the electric charge within the casing and avoid any sort of injury to a worker.

Still referring to FIG. 2, case 200 includes an interior surface 208. In this disclosure, the "interior surface" is the surface on the inside of the case that comes into contact with the layer of the plurality of battery cells. Interior surface 208 may include of any adonized material. In this disclosure, anodized means that the object is coated in a protective oxide layer through an electrochemical process. The purpose of anodizing a material is to increase its thermal conductivity, corrosion resistance, and abrasion resistance. Adonizing the interior surface 208 of the case allows for the mitigation of charge buildup and avoids storing energy at a high voltage. Examples of adonized materials that interior surface 208 may be composed of are aluminum, aluminum alloys, magnesium, titanium, and the like. It is important to note that the interior surface 208 and exterior surface 204 of the case are made from different materials and are explained further herein with reference to FIG. 3.

Still referring to FIG. 2, case 200 includes opening 212. Opening 212 may be located anywhere on the case, but the exemplary embodiment illustrates the opening at the top of the case. In this disclosure, an "opening" is a hole on the case that allows the layer of battery cells to be place inside and also allows a lid to be secured to it. The main purpose of the opening may be to have an entrance and exit for the installation and removal of the layers of battery cells. Lid is further described herein with reference to FIG. 5. Examples of opening 212 may be the entire top surface of the case missing to become a hole, as seen in FIG. 1., or a side surface could be removed and become opening 212 on the case. Only one opening 212 may be needed, but more may be placed on the case 200 if necessary. Opening 212 has a different function than hole 220, which is explained further below. Opening 212 is discussed more herein with reference the lid in FIG. 5.

Still referring to FIG. 2, case 200 includes lip 216. In this disclosure, "lip" is an edge that projects out of opening 212 of case 200 wherein the lid of the case may rest on it without falling into the case. Lip 216 may include a longer side and a shorter side. Lip 216 may also include a flange on its longer side to attach the lid to the case. In this embodiment, a "flange" is a piece of the lip that serves to stabilize the lid to the case. There may be at least one lip 216 attached to the opening but there may be any amount; more lips mean more flanges to lock lid into place.

Still referring to FIG. 2, case 200 may include hole 220. More than one hole 220 may be cut into case 200 if needed. In this embodiment, hole 220 serves as a cutout located on the outside of the case. Hole 220 may not be as large as opening 212 and may not be covered with a lid. The purpose of hole 220, or holes, may be to vent hot gases out of the case to reduce the temperature and voltage inside the case. In some embodiments, the cutouts may be covered by a material to stop the ventilation and to stop any foreign materials from entering the case, but the materials must be heat resistant, so the hot gases do not melt it. Hole or holes 220 are not needed to for the system 200 but are useful to help cool and ventilate the case.

Figure 3:
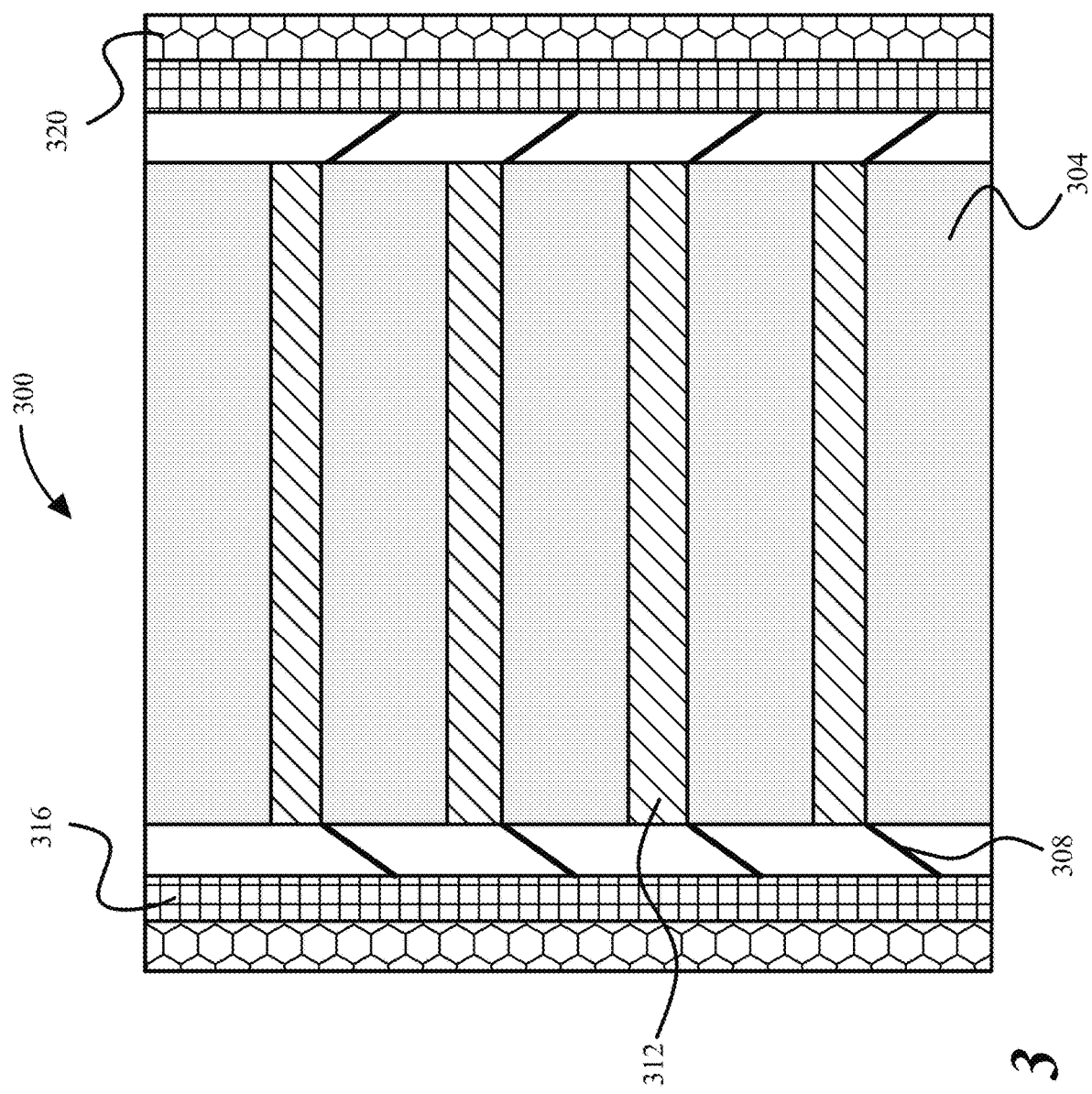
FIG. 3 is a diagram showing a possible embodiment of the plurality of battery cells.

Now referring to FIG. 3, an exemplary embodiment of the layers of the plurality of battery cells is illustrated. The system 300 comprises of a plurality of layering of the following: battery cell 304, fin 308, insulation layer 312, interior surface 208, and exterior surface 204. In this disclosure, "layers" refers to the method of stacking the plurality of battery cells on top of each other when placing them into the case.

Still referring to FIG. 3, system 300 includes a plurality of battery cells 304. A first plurality of battery cells may include lithium-ion battery cells. A first plurality of battery cells may include pouch cells. In some embodiments, a battery cell of a first plurality of battery cells may include a flexible casing. A "battery cell" as used in this disclosure, is an electrochemical element that holds an electric potential. In some embodiments, plurality of battery cells 304 may be lithium-ion pouch cells. In some embodiments, battery pack may be configured to hold 16 battery cells. In some embodiments, battery pack may be configured to include any number of battery cells. In other embodiments, battery pack may be configured to hold more or less than 16 battery cells. Battery cells 304 in the battery pack may be electrically configured to connect to one another. In one embodiment, battery cells 304 may have an insulating barrier. In some embodiments, battery cells 304 may be configured in series and/or in parallel. In some embodiments, battery cells 304 may be positioned in one row in the battery pack. In other embodiments, battery cells 304 may be positioned in multiple rows in the battery pack. In some embodiments, battery cells 304 may be in a staggered arrangement in battery pack. In some embodiments, a battery assembly may be configured to include an electrical bridging device. An electrical bridging device may include a cooling element. As used in the current disclosure, a "cooling element" is a device used to lower a temperature of a component such as a battery. In a nonlimiting example, a cooling element may include air conditioners, fans, air cooled heat exchanger, the use of coolant, water cooler, or the like. In some embodiments, an electrical bridging device may be configured to carry an electrical current. In some embodiments, an electrical bridging device may be configured to be housed inside a plurality of battery cells. In some embodiments, a top of each battery cell of a plurality of battery cells may be coupled to a first side of an electrical bridging device. In some embodiments, a top of each battery cell of a plurality of battery cells may be coupled to another side of an electrical bridging device.

In some embodiments and still referring to FIG. 3, battery cells 304 may be disposed and/or arranged within a respective battery pack in groupings of any number of columns and rows. In some embodiments, any two adjacent rows of battery cells 304 may be offset by a distance equal to a width or length of a battery cell 304. This arrangement of battery cells 304 is only a non-limiting example and in no way precludes other arrangement of battery cells. In some embodiments, battery cells 304 may be fixed in position by a battery cell retainer. Battery cells 304 may each include a cell configured to include an electrochemical reaction that produces electrical energy sufficient to power at least a portion of an electric aircraft. In some embodiments, battery cells 304 may be electrically connected in series, in parallel, or a combination of series and parallel. Series connection, as used herein, includes wiring a first terminal of a first cell to a second terminal of a second cell and further configured to include a single conductive path for electricity to flow while maintaining the same current (measured in Amperes) through any component in the circuit. Battery cells 304 may use the term 'wired', but one of ordinary skill in the art would appreciate that this term is synonymous with 'electrically connected', and that there are many ways to couple electrical elements like battery cells 304 together. As an example, battery cells 304 may be coupled via prefabricated terminals of a first gender that mate with a second terminal with a second gender. Parallel connection, as used herein, includes wiring a first and second terminal of a first battery cell to a first and second terminal of a second battery cell and further configured to include more than one conductive path for electricity to flow while maintaining the same voltage (measured in Volts) across any component in the circuit. Battery cells 304 may be wired in a series-parallel circuit which combines characteristics of the constituent circuit types to this combination circuit. Battery cells 304 may be electrically connected in any arrangement which may confer onto the system the electrical advantages associated with that arrangement such as high-voltage applications, high-current applications, or the like. In some embodiments, battery cell retainer may employ a staggered arrangement to allow more battery cells to be disposed closer together than in columns and rows like in a grid pattern. A staggered arrangement may also be configured to allow better thermodynamic dissipation. In other embodiments, cell retainer may hold battery cells 304 in a square or grid-like pattern.

Still referring to FIG. 3, system 300 includes a layer of insulation 312 between each later of battery cells 304. In this disclosure, "insulation layer" is the layer of thermal insulation separating the layers of plurality of battery cells. Insulation layer 312 will be compressed, so the material from which it is made up of must withstand the expected pressure from the compressed case; the case applies a pressure within a range of 2-5 pounds per square inch (PSI) (1.4-3.4 kPa) to the layers of insulation and layers of plurality of battery cells. For example, using the spring constant of the material as a metric of interest, the spring constant of the material should be non-negligible. In this disclosure, the spring constant is the force needed to stretch or press a spring. In some embodiments, the material may be aerogel since it is a good thermal insulator and has a non-negligible spring constant. Insulation layer 312 prevents heat from spreading from one cell to another. Without any insulation, if a battery cell fails and releases catastrophic amounts of heat, then the whole battery will fail and cause catastrophic damage to the aircraft.

Still referring to FIG. 3, system 300 includes a thermally conducting fin 308 contacting the thermally conducting interior surface 208. In this disclosure, a thermally conducting fin is a small piece of thermally conducting material that contacts the insulation layer and the interior surface of the can. As used in this disclosure, a "thermally conducting" material is a material that has a high thermal conductivity as the term is understood to mean for persons in the battery/battery management line of work. Most materials considered thermally conductive have a thermal conductivity within the range of 10 or more watts per kelvin-meter; a highly thermally conductive material may have a thermal conductivity of greater than 200 watts per kelvin-meter. Example materials include, without limitation, silver, copper, aluminum, iron, titanium, or even diamond which has an extremely high thermal conductivity. Thermally conducting fin 308 includes a spring force that pushes it towards the anodized interior surface of the can. Fin 308 include a plurality of independent sections wherein each section has an independent spring force that independently pushed that section of the fin towards the adonized interior surface. In this disclosure, spring force is the force exerted by a compressed or stretched spring upon an object that may be attached to it. Fin 308 maybe made out of any material that may contain a spring force, such as elastic, spring steel, or the like. Fin 308 must also be made out of a conductive material so that the thermally conductive layer with the fins can conduct heat away from the cell. Fin 308 may be any shape or size as long as it is still contacting both surfaces. Additionally, inserting the system into case 200 may elastically deform thermally conducting fin 308, causing it to exert an elastic recoil force, such as without limitation a recoil force as indicated by Hooke's law.

Referring still to FIG. 3, system 300 includes a pouch cell within the battery cells 304. As used in this disclosure, "pouch cell" is a battery cell or module that includes a pouch. In some cases, a pouch cell may include or be referred to as a prismatic pouch cell, for example when an overall shape of pouch may be prismatic. In some cases, a pouch cell may include a pouch, which is further described herein with reference to FIG. 4. Pouch cell 404 may include without limitation a battery cell using nickel-based chemistries such as nickel cadmium or nickel metal hydride, a battery cell using lithium-ion battery chemistries such as a nickel cobalt aluminum (NCA), nickel manganese cobalt (NMC), lithium iron phosphate (LiFePO4), lithium cobalt oxide (LCO), lithium manganese oxide (LMO), a battery cell using lithium polymer technology, and/or metal-air batteries. Pouch cell 404 may include lead-based batteries such as without limitation lead acid batteries and lead carbon batteries. Pouch cell 404 may include lithium sulfur batteries, magnesium ion batteries, and/or sodium ion batteries. Pouch cell 404 may include solid state batteries or supercapacitors or another suitable energy source. In other embodiments, the pouch cell may be a prismatic, cylindrical, or other type of battery cell. In some embodiments, the pouch cell may be a lithium-ion battery. In some embodiments, the lithium-ion battery may include lithium-ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO). Persons skilled in the art, upon reviewing the entirety of this disclosure, will be aware of various devices of components that may be used as a pouch cell.

Figure 4:
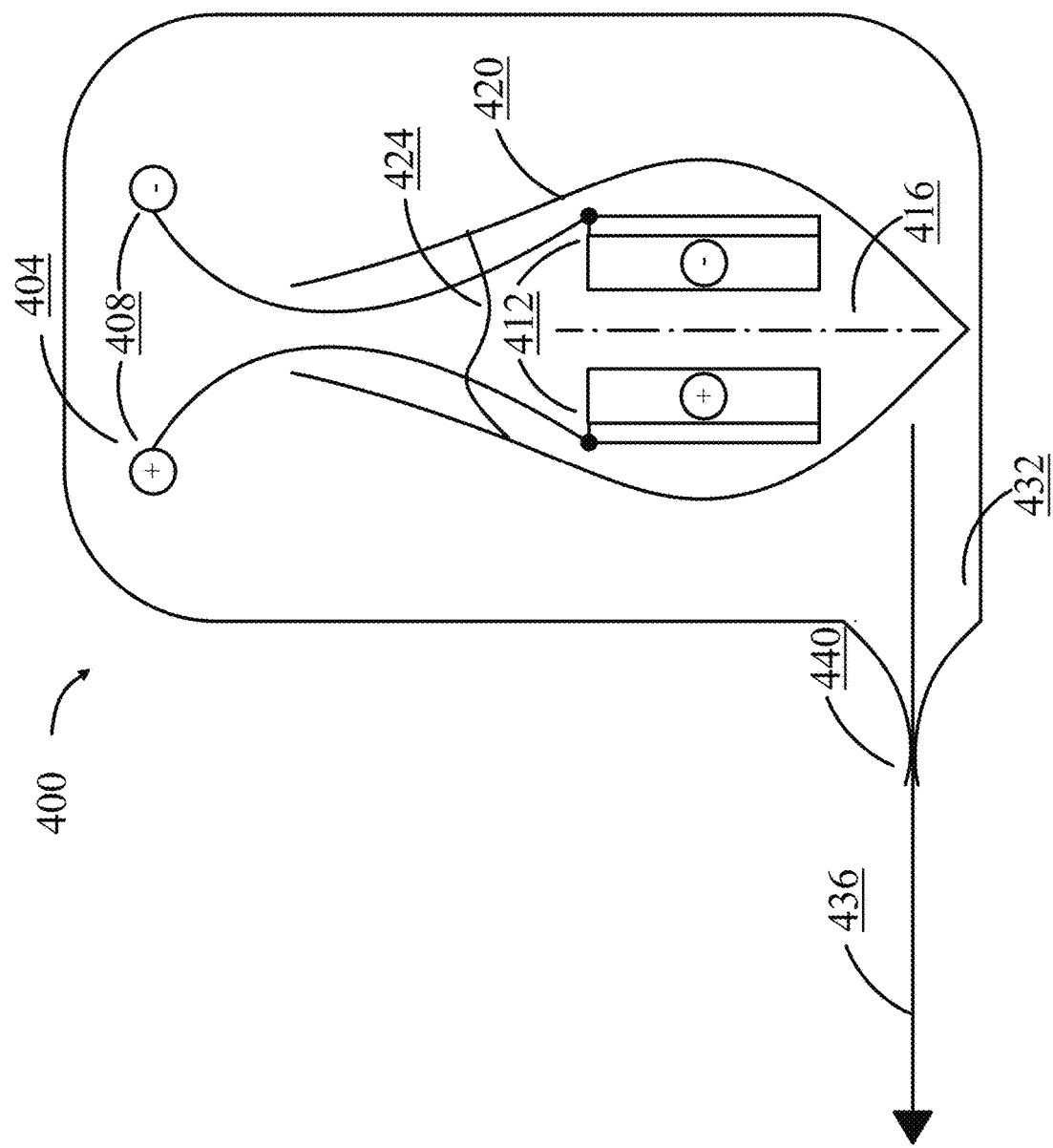
FIG. 4 is a diagrammatic representation of an exemplary embodiment of the pouch cell.

Referring now to FIG. 4, a pouch cell 404 is illustrated. Pouch cell includes a pair of electrodes 408, pair of foil tabs 412, insulation layer 416, pouch 420, electrolyte 424, ejecta barrier 428, vent 432, flow path 436, and valve 440. Pouch cell 404 may include any pouch cell as described in this disclosure.

Still referring to FIG. 4, pouch cell 404 may include a pair of electrodes 408. In this disclosure, a pair of electrodes is a conductor through which electricity enters or leaves an object, and in this case the object is pouch cell 404. In some embodiments, conductive foil tabs may be electrically connected to electrodes located inside a pouch cell 404. Electrodes 408 may include a positive electrode and a negative electrode. Each electrode of may include an electrically conductive element. Non-limiting exemplary electrically conductive elements include braided wire, solid wire, metallic foil, circuitry, such as printed circuit boards, and the like. Electrodes 408 may be in electric communication with a pair of foil tabs. Electrodes 408 may be bonded in electric communication with pair of foil tabs by any known method, including without limitation welding, brazing, soldering, adhering, engineering fits, electrical connectors, and the like.

Still referring to FIG. 4, pouch cell 404 may include a pair of foil tabs 412 in electrical communication with the electrodes 408. In this disclosure, pair of foil tabs 412 are tabs that protrude from the battery which allows the cells energy to be transferred to an external source. Conductive foils tabs 412 may be configured to carry positive and negative terminals to an outside of a battery cell of a first plurality of battery cells. In some embodiments, conductive foil tabs may be wielded to an outside of a battery cell. In some cases, pair of foil tabs 412 may include a cathode and an anode. In some cases, an exemplary cathode may include a lithium-based substance, such as lithium-metal oxide, bonded to an aluminum foil tab. In some cases, an exemplary anode may include a carbon-based substance, such as graphite, bonded to a copper tab. In some embodiments, an anode may be double sided. In some embodiments, a cathode may be double sided. In some embodiments, an anode and a cathode may be stacked and wrapped in a separator. In some embodiments, an anode, cathode, and separator may be stacked and wrapped in a z-fold pattern. In other embodiments, an anode, cathode, and separator may be stacked and wrapped in a rectangular, square, or other pattern. In some embodiments, a cathode and an anode may be welded together, placing them in a series connection. In one embodiment, a cathode and an anode may be welded ultrasonically. In some embodiments, a cathode and an anode may be further welded to pair of foil tabs 412. Pair of foil tabs 412 may be sealed to an outside portion of battery cell. An "outside portion" as used in this disclosure may be an exterior surface of an object. An outside portion may be included in a first plurality of battery cells and/or a second plurality of battery cells. In some embodiments, pair of foil tabs 412 may be configured to connect to an external load or power source. In some embodiments, pair of foil tabs 412 may be configured to power an electric aircraft. In some embodiments, an electric aircraft may be an electric vertical takeoff and landing vehicle ("eVTOL").

Still referring to FIG. 4, pouch cell 404 may include an insulator layer 416 located substantially between the at least a pair of foil tabs 412. As used in this disclosure, an "insulator layer" is an electrically insulating material that is substantially permeable to battery ions, such as without limitation lithium ions. In some cases, insulator layer may be referred to as a separator layer or simply separator. In some cases, insulator 416 may be configured to prevent electrical communication directly between pair of foil tabs 412 (e.g., cathode and anode). In some cases, insulator layer 416 may be configured to allow for a flow ions across it. Insulation layer 416 may include a polymer, for example polyolifine (PO). Insulation layer 416 may include pours which are configured to allow for passage of ions, for example lithium ions. In some cases, pours of a PO separator may have a width no greater than 100 µm, 10 µm, or 0.1 µm. In some cases, a PO separator may have a thickness within a range of 1-100 µm, or 10-50 µm.

Still referring to FIG. 4, pouch cell 404 may include a pouch 420 substantially encompassing the at least a pair of foil tabs 412 and at least a portion of the at least a separator layer 416. In this disclosure, pouch may be a small, flexible bag that holds the pair of foil tabs 412 and insulation layer 412. Pouch 420 may be substantially flexible. Alternatively or additionally, in some cases, a pouch 304 may be substantially rigid. In some cases, pouch 304 may include a polymer, such as without limitation polyethylene, acrylic, polyester, and the like. In some case, pouch 304 may be coated with one or more coatings. For example, in some cases, pouch 304 may have an outer surface. In some embodiments, the outer surface may be coated with a metalizing coating, such as an aluminum or nickel containing coating. In some cases, pouch coating be configured to electrically ground and/or isolate pouch, increase pouches impermeability, increase pouches resistance to high temperatures, increases pouches thermal resistance (po), and the like.

Still referring to FIG. 4, pouch cell 404 may include and an electrolyte 424 within the pouch 420. An electrolyte may be located in pouch 420. In this disclosure, electrolyte is chemical medium that allows the flow of electrical charge between the cathode and anode of the pair of foil tabs 412. In some cases, the electrolyte may include a liquid, a solid, a gel, a paste, and/or a polymer. In some embodiments, the electrolyte may be a lithium salt such as LiPF6. In some embodiments, the lithium salt may be lithium hexafluorophosphate, lithium tetrafluoroborate, lithium perchlorate, or other lithium salts. In some embodiments, the lithium salt may be in an organic solvent. In some embodiments, the organic solvent may be ethylene carbonate, dimethyl carbonate, diethyl carbonate or other organic solvents. In some embodiments, the electrolyte may wet or contact one or both of at least a pair of foil tabs Still referring to FIG. 4, pouch cell 404 may include an ejecta barrier 428. As used in this disclosure, an "ejecta barrier" is any material or structure that is configured to substantially block, contain, or otherwise prevent passage of cell ejecta. For example, ejecta barrier 428 may substantially encapsulate pouch cell 404. As used in this disclosure, "ejecta" may be any material that has been ejected, for example from a battery cell. In some cases, cell ejecta may be ejected during thermal runaway of a battery cell. Alternatively or additionally, in some cases, cell ejecta may be ejected without thermal runaway of a battery cell. In some cases, cell ejecta may include lithium-based compounds. Alternatively or additionally, cell ejecta may include carbon-based compounds, such as without limitation carbonate esters. Cell ejecta may include matter in any phase or form, including solid, liquid, gas, vapor, and the like. In some cases, cell ejecta may undergo a phase change, for example, and without limitation, cell ejecta may be vaporous as it is initially being ejected and then cool and condense into a solid or liquid after ejection. In an embodiment, and without limitation, ejecta barrier 428 may be configured to prevent materials ejected from pouch cell 404 from coming into contact with other pouch cells. For example, and without limitation, ejecta barrier 428 may be substantially impermeable to cell ejecta from pouch cell 104 and/or one or more additional pouch cells. In some embodiments, ejecta barrier 428 may include titanium. As used in this disclosure "substantially impermeable" may be a characteristic of ejecta barrier that denotes the barrier prevents passage of one or more gases, fluids, and/or solids. In an embodiment, and without limitation, substantially impermeable may include a barrier being fully impermeable. For example, and without limitation, ejecta barrier 428 may be fully impermeable as a function of restricting and/or preventing all passage of cell ejecta across a barrier. As a further non-limiting example, ejecta barrier 428 may be impermeable as a function of blocking and/or halting all passage of cell ejecta across a barrier. In an embodiment, and without limitation, substantially impermeable may include ejecta barrier 428 being selectively impermeable, wherein a magnitude and/or percentage of cell ejecta may be allowed to pass and/or permeate ejecta barrier 428. For example, and without limitation, ejecta barrier 428 may be selectively impermeable for a fluid as a function of allowing 20% of a fluid to permeate, wherein ejecta barrier 428 may be impermeable to a gas such as carbon monoxide, wherein no carbon monoxide may permeate ejecta barrier 428.

Still referring to FIG. 4, ejecta barrier 428 may include a carbon fiber element. As used in this disclosure a "carbon fiber element" is a barrier comprising an element of carbon. For example and without limitation, carbon fiber element may include one or more carbon fiber sheets, carbon fiber supported metals, carbon fiber bands, and the like thereof. In an embodiment, and without limitation, carbon fiber element may include one or more carbon fibers comprising 5-10 micrometers in diameter. In another embodiment, and without limitation, carbon fiber element may include high stiffness, high tensile strength, low weight to strength ratio, high chemical resistance, high temperature tolerance, and/or low thermal expansion. In an embodiment, and without limitation, carbon fiber element may include one or more composites such as a plastic resin, polymer, graphite, and the like thereof. In some cases, ejecta barrier 428 may include at least a one of a lithophilic or a lithophobic material or layer, configured to absorb and/or repel lithium-based compounds. In some cases, ejecta barrier 428 may include a lithophilic metal coating, such as silver or gold. In some cases, ejecta barrier 428 may be flexible and/or rigid. In some cases, ejecta barrier 428 may include a sheet, a film, a foil, or the like. For example in some cases, ejecta barrier 428 may be between 25 and 5,000 micrometers thick. In some cases, ejecta barrier 428 may have a nominal thickness of about 2 mm. Alternatively or additionally, in some cases, ejecta barrier 428 may include rigid and/or structural elements, for instance which are solid. Rigid ejecta barriers 428 may include metals, composites and the like. In some cases, ejecta barrier 428 may be further configured to structurally support pouch cell 404. For example in some cases, pouch cell 404 may be mounted to a rigid ejecta barrier 428. Ejecta barrier 428 may configured to prevent ejecta from one pouch cell 404 from reaching another pouch cell. In some cases, ejecta may include hot matter, which if left uncontained could transfer heat to other, e.g., neighboring, pouch cells. By preventing hot ejecta from reaching pouch cells ejecta barrier 428 may aid in preventing progression of thermal runaway between battery cells within pouch cell 404. In some cases, ejecta may include combustible materials, which if left uncontained could settle upon other, e.g., neighboring, pouch cells. Combustible materials once combustion conditions are met may combust generating an exothermic reaction, which can induce thermal runaway on nearby battery cells. Combustion conditions can include presence of oxygen, fuel, spark, flash point, fire point, and/or autoignition temperature.

Still referring to FIG. 4, pouch cell 404 may include a vent 432. Vent 432 may provide for ejecta flow along a flow path 436. In some cases, vent 432 may be configured to vent cell ejecta from pouch cell 404. In some cases, at least a vent 432 may be configured to vent cell ejecta along a flow path 436. For example fluids such as gases liquids, or any material that acts as a gas or liquid, flowing along the flow path 436 may be cordoned away from contact with pouch cell 404. For example flow path 436 may be configured to not intersect with any surface of pouch cell 404. As a further non-limiting example, flow path 436 may be configured to extend from pouch cell 404 to an exterior location. As used in this disclosure an "exterior location" is a location and/or place that exists outside of stack battery pack. In an embodiment, and without limitation, exterior location may include a location and/or place that exists outside of an aircraft, wherein an aircraft is described below, in reference to FIG. 1. Flow path 436 may include any channel, tube, hose, conduit, or the like suitable for facilitating fluidic communication, for example with a pouch cell. In some cases, flow path 436 may include check valve 440. As used in this disclosure, a "check valve" is a valve that permits flow of a fluid only in certain, for example one, direction. In some cases check valve 440 may be configured to allow flow of fluids substantially only away from pouch cell 404 while preventing back flow of vented fluid to pouch cell 404. In some cases, check valve 440 may include a duckbill check valve. In some cases, a duckbill check valve may have lips which are substantially in a shape of a duckbill. Lips may be configured to open to allow forward flow (out of the lips), while remaining normally closed to prevent backflow (into the lips). In some cases, duckbill lips may be configured to automatically close (remain normally closed), for example with use of a compliant element, such as without limitation an elastomeric material, a spring, and the like. In some embodiments vent may include a mushroom poppet valve. In some cases, a mushroom poppet valve may include a mushroom shaped poppet. Mushroom shaped poppet may seal against a sealing element, for example a ring about an underside of a cap of the mushroom shaped poppet. In some cases, mushroom poppet valve may be loaded against sealing element, for example by way of a compliant element, such as a spring. According to some embodiments, vent 160 may have a vacuum applied to aid in venting of cell ejecta. Vacuum pressure differential may range from 0.1" Hg to 36" Hg. In some cases, vent 432 may be configured to provide fluidic communication through at least one of ejecta barrier 428 and/or pouch 420. In some cases, vent 432 may include a seam. Seam may be a seam of pouch 420. Alternatively or additionally; seam may be a seam of ejecta barrier 428. Vent may include a check valve 440. Check valve 440 may be configured to allow for a flow fluid in substantially one direction, for example away from pouch cell 404. In some cases, vent 432 may be configured to allow for a venting of ejecta from pouch cell 404 without substantially any flow of ejecta toward the pouch cell 404, for example from other battery cells.

Figure 5:
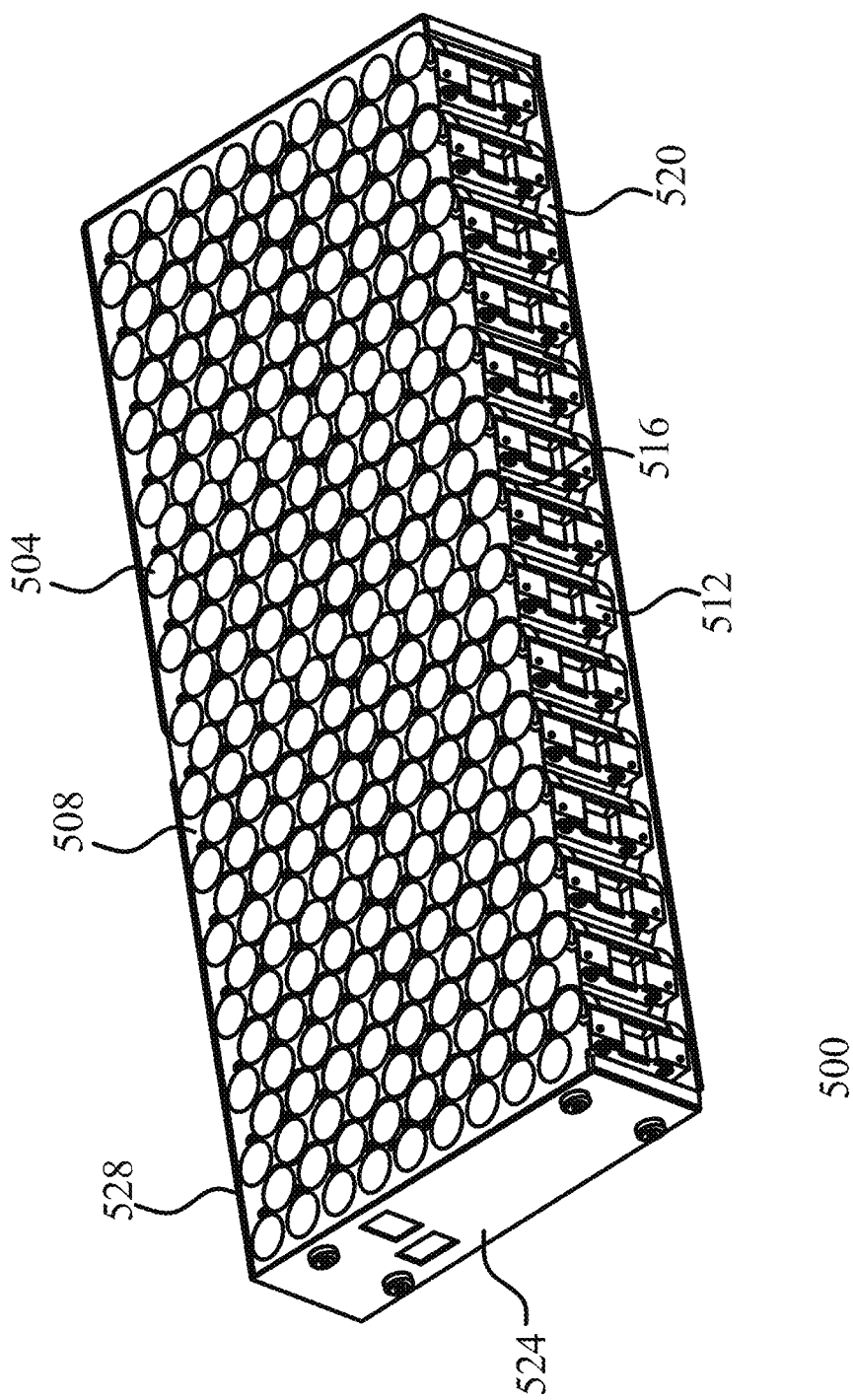
FIG. 5 is a diagrammatic representation of an exemplary embodiment of a battery module.

Referring now to FIG. 5, battery module 500 with multiple battery units 516 is illustrated, according to embodiments. Battery module 500 may comprise a battery cell 504, cell retainer 508, cell guide 512, protective wrapping, back plate 520, end cap 524, and side panel 528. Battery module 500 may comprise a plurality of battery cells, an individual of which is labeled 504. In embodiments, battery cells 504 may be disposed and/or arranged within a respective battery unit 516 in groupings of any number of columns and rows. For example, in the illustrative embodiment of FIG. 5, battery cells 504 are arranged in each respective battery unit 516 with 18 cells in two columns. It should be noted that although the illustration may be interpreted as containing rows and columns, that the groupings of battery cells in a battery unit, that the rows are only present as a consequence of the repetitive nature of the pattern of staggered battery cells and battery cell holes in cell retainer being aligned in a series. While in the illustrative embodiment of FIG. 5 battery cells 504 are arranged 18 to battery unit 516 with a plurality of battery units 516 comprising battery module 500, one of skill in the art will understand that battery cells 504 may be arranged in any number to a row and in any number of columns and further, any number of battery units may be present in battery module 500. According to embodiments, battery cells 504 within a first column may be disposed and/or arranged such that they are staggered relative to battery cells 504 within a second column. In this way, any two adjacent rows of battery cells 504 may not be laterally adjacent but instead may be respectively offset a predetermined distance. In embodiments, any two adjacent rows of battery cells 504 may be offset by a distance equal to a radius of a battery cell. This arrangement of battery cells 504 is only a non-limiting example and in no way preclude other arrangement of battery cells.

In embodiments, battery cells 504 may be fixed in position by cell retainer 508. For the illustrative purposed within FIG. 5, cell retainer 508 is depicted as the negative space between the circles representing battery cells 504. Cell retainer 508 comprises a sheet further comprising circular openings that correspond to the cross-sectional area of an individual battery cell 504. Cell retainer 508 comprises an arrangement of openings that inform the arrangement of battery cells 504. In embodiments, cell retainer 508 may be configured to non-permanently, mechanically couple to a first end of battery cell 504.

According to embodiments, battery module 500 may further comprise a plurality of cell guides 512 corresponding to each battery unit 516. Cell guide 512 may comprise a solid extrusion with cutouts (e.g. scalloped) corresponding to the radius of the cylindrical battery cell 504. Cell guide 512 may be positioned between the two columns of a battery unit 516 such that it forms a surface (e.g. side surface) of the battery unit 516. In embodiments, the number of cell guides 512 therefore match in quantity to the number of battery units 516. Cell guide 512 may comprise a material suitable for conducting heat.

Battery module 500 may also comprise a protective wrapping woven between the plurality of battery cells 504. Protective wrapping may provide fire protection, thermal containment, and thermal runaway during a battery cell malfunction or within normal operating limits of one or more battery cells 504 and/or potentially, battery module 500 as a whole. Battery module 500 may also comprise a backplate 520. Backplate 520 is configured to provide structure and encapsulate at least a portion of battery cells 504, cell retainers 508, cell guides 512, and protective wraps. End cap 524 may be configured to encapsulate at least a portion of battery cells 504, cell retainers 508, cell guides 512, and battery units 516, as will be discussed further below, end cap may comprise a protruding boss that clicks into receivers in both ends of back plate 520, as well as a similar boss on a second end that clicks into sense board. Side panel 528 may provide another structural element with two opposite and opposing faces and further configured to encapsulate at least a portion of battery cells 504, cell retainers 508, cell guides 512, and battery units 516.

Still referring to FIG. 5, in embodiments, battery module 500 can include one or more battery cells 504. In another embodiment, battery module 500 comprises a plurality of individual battery cells 504. Battery cells 504 may each comprise a cell configured to include an electrochemical reaction that produces electrical energy sufficient to power at least a portion of an electric aircraft and/or a cart 100. Battery cell 504 may include electrochemical cells, galvanic cells, electrolytic cells, fuel cells, flow cells, voltaic cells, or any combination thereof—to name a few. In embodiments, battery cells 504 may be electrically connected in series, in parallel, or a combination of series and parallel. Series connection, as used herein, comprises wiring a first terminal of a first cell to a second terminal of a second cell and further configured to comprise a single conductive path for electricity to flow while maintaining the same current (measured in Amperes) through any component in the circuit. Battery cells 504 may use the term 'wired', but one of ordinary skill in the art would appreciate that this term is synonymous with 'electrically connected', and that there are many ways to couple electrical elements like battery cells 504 together. As an example, battery cells 504 can be coupled via prefabricated terminals of a first gender that mate with a second terminal with a second gender. Parallel connection, as used herein, comprises wiring a first and second terminal of a first battery cell to a first and second terminal of a second battery cell and further configured to comprise more than one conductive path for electricity to flow while maintaining the same voltage (measured in Volts) across any component in the circuit. Battery cells 504 may be wired in a series-parallel circuit which combines characteristics of the constituent circuit types to this combination circuit. Battery cells 504 may be electrically connected in any arrangement which may confer onto the system the electrical advantages associated with that arrangement such as high-voltage applications, high-current applications, or the like.

As used herein, an electrochemical cell is a device capable of generating electrical energy from chemical reactions or using electrical energy to cause chemical reactions. Further, voltaic or galvanic cells are electrochemical cells that generate electric current from chemical reactions, while electrolytic cells generate chemical reactions via electrolysis. As used herein, the term 'battery' is used as a collection of cells connected in series or parallel to each other.

According to embodiments and as discussed above, any two rows of battery cells 504 and therefore cell retainer 508 openings are shifted one half-length so that no two battery cells 504 are directly next to the next along the length of the battery module 500, this is the staggered arrangement presented in the illustrated embodiment of FIG. 5. Cell retainer 508 may employ this staggered arrangement to allow more cells to be disposed closer together than in square columns and rows like in a grid pattern. The staggered arrangement may also be configured to allow better thermodynamic dissipation, the methods of which may be further disclosed hereinbelow. Cell retainer 508 may comprise staggered openings that align with battery cells 504 and further configured to hold battery cells 504 in fixed positions. Cell retainer 508 may comprise an injection molded component. Injection molded component may comprise a component manufactured by injecting a liquid into a mold and letting it solidify, taking the shape of the mold in its hardened form. Cell retainer 508 may comprise liquid crystal polymer, polypropylene, polycarbonate, acrylonitrile butadiene styrene, polyethylene, nylon, polystyrene, polyether ether ketone, to name a few. Cell retainer 508 may comprise a second cell retainer fixed to the second end of battery cells 504 and configured to hold battery cells 504 in place from both ends. The second cell retainer may comprise similar or the exact same characteristics and functions of first cell retainer 508. Battery module 500 may also comprise cell guide 512. Cell guide 512 includes material disposed in between two rows of battery cells 504. In embodiments, cell guide 512 can be configured to distribute heat that may be generated by battery cells 504.

According to embodiments, battery module 500 may also comprise back plate 520. Back plate 520 is configured to provide a base structure for battery module 500 and may encapsulate at least a portion thereof. Backplate 520 can have any shape and includes opposite, opposing sides with a thickness between them. In embodiments, back plate 520 may comprise an effectively flat, rectangular prism shaped sheet. For example, back plate 520 can comprise one side of a larger rectangular prism which characterizes the shape of battery module 500 as a whole. Back plate 520 also comprises openings correlating to each battery cell 504 of the plurality of battery cells 504. Back plate 520 may comprise a lamination of multiple layers. The layers that are laminated together may comprise FR-4, a glass-reinforced epoxy laminate material, and a thermal barrier of a similar or exact same type as disclosed hereinabove. Back plate 520 may be configured to provide structural support and containment of at least a portion of battery module 500 as well as provide fire and thermal protection.

According to embodiments, battery module 500 may also comprise first end cap 524 configured to encapsulate at least a portion of battery module 500. End cap 524 may provide structural support for battery module 500 and hold back plate 520 in a fixed relative position compared to the overall battery module 500. End cap 524 may comprise a protruding boss on a first end that mates up with and snaps into a receiving feature on a first end of back plate 520. End cap 524 may comprise a second protruding boss on a second end that mates up with and snaps into a receiving feature on sense board.

Battery module 500 may also comprise at least a side panel 528 that may encapsulate two sides of battery module 500. Side panel 528 may comprise opposite and opposing faces comprising a metal or composite material. In the illustrative embodiment of FIG. 5, a second side panel 528 is present but not illustrated so that the inside of battery module 500 may be presented. Side panel(s) 528 may provide structural support for battery module 500 and provide a barrier to separate battery module 500 from exterior components within aircraft or environment.

Figure 6:
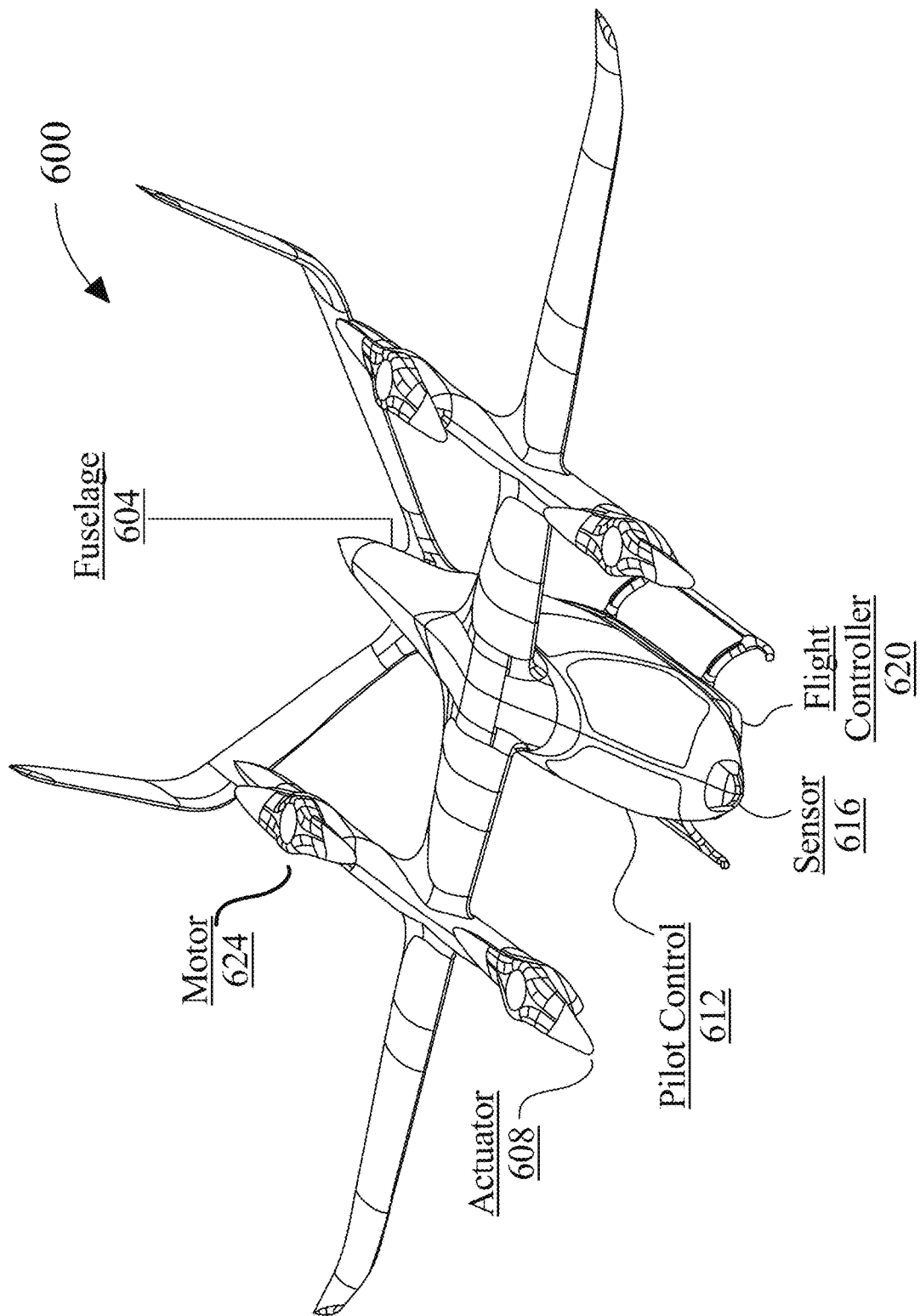
FIG. 6 is a schematic of an exemplary electric aircraft.

Referring now to FIG. 6, an exemplary embodiment of an aircraft 600 is illustrated. Aircraft 600 may include an electrically powered aircraft (i.e., electric aircraft). In some embodiments, electrically powered aircraft may be an electric vertical takeoff and landing (eVTOL) aircraft. Electric aircraft may be capable of rotor-based cruising flight, rotor-based takeoff, rotor-based landing, fixed-wing cruising flight, airplane-style takeoff, airplane-style landing, and/or any combination thereof. "Rotor-based flight," as described in this disclosure, is where the aircraft generated lift and propulsion by way of one or more powered rotors coupled with an engine, such as a quadcopter, multi-rotor helicopter, or other vehicle that maintains its lift primarily using downward thrusting propulsors. "Fixed-wing flight," as described in this disclosure, is where the aircraft is capable of flight using wings and/or foils that generate lift caused by the aircraft's forward airspeed and the shape of the wings and/or foils, such as airplane-style flight.

Still referring to FIG. 6, aircraft 600 may include a fuselage 604. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 604 may comprise structural elements that physically support the shape and structure of an aircraft. Structural elements may take a plurality of forms, alone or in combination with other types. Structural elements may vary depending on the construction type of aircraft and specifically, the fuselage. Fuselage 604 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

Still referring to FIG. 6, aircraft 600 may include a plurality of actuators 608. Actuator 608 may include any motor and/or propulsor described in this disclosure, for instance in reference to FIGS. 1-6. In an embodiment, actuator 608 may be mechanically coupled to an aircraft. As used herein, a person of ordinary skill in the art would understand "mechanically coupled" to mean that at least a portion of a device, component, or circuit is connected to at least a portion of the aircraft via a mechanical coupling. Said mechanical coupling can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, Hirth joints, hydrodynamic coupling, jaw coupling, magnetic coupling, Oldham coupling, sleeve coupling, tapered shaft lock, twin spring coupling, rag joint coupling, universal joints, or any combination thereof. As used in this disclosure an "aircraft" is vehicle that may fly. As a non-limiting example, aircraft may include airplanes, helicopters, airships, blimps, gliders, paramotors, and the like thereof. In an embodiment, mechanical coupling may be used to connect the ends of adjacent parts and/or objects of an electric aircraft. Further, in an embodiment, mechanical coupling may be used to join two pieces of rotating electric aircraft components.

With continued reference to FIG. 6, a plurality of actuators 608 may be configured to produce a torque. As used in this disclosure a "torque" is a measure of force that causes an object to rotate about an axis in a direction. For example, and without limitation, torque may rotate an aileron and/or rudder to generate a force that may adjust and/or affect altitude, airspeed velocity, groundspeed velocity, direction during flight, and/or thrust. For example, plurality of actuators 608 may include a component used to produce a torque that affects aircrafts' roll and pitch, such as without limitation one or more ailerons. An "aileron," as used in this disclosure, is a hinged surface which form part of the trailing edge of a wing in a fixed wing aircraft, and which may be moved via mechanical means such as without limitation servomotors, mechanical linkages, or the like. As a further example, plurality of actuators 608 may include a rudder, which may include, without limitation, a segmented rudder that produces a torque about a vertical axis. Additionally or alternatively, plurality of actuators 608 may include other flight control surfaces such as propulsors, rotating flight controls, or any other structural features which can adjust movement of aircraft 600. Plurality of actuators 608 may include one or more rotors, turbines, ducted fans, paddle wheels, and/or other components configured to propel a vehicle through a fluid medium including, but not limited to air.

Still referring to FIG. 6, plurality of actuators 608 may include at least a propulsor component. As used in this disclosure a "propulsor component" or "propulsor" is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 6, propulsor may include a propeller, a blade, or any combination of the two. A propeller may function to convert rotary motion from an engine or other power source into a swirling slipstream which may push the propeller forwards or backwards. Propulsor may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g. a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 6, propulsor may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

With continued reference to FIG. 6, plurality of actuators 608 may include power sources, control links to one or more elements, fuses, and/or mechanical couplings used to drive and/or control any other flight component. Plurality of actuators 608 may include a motor that operates to move one or more flight control components and/or one or more control surfaces, to drive one or more propulsors, or the like. A motor may be driven by direct current (DC) electric power and may include, without limitation, brushless DC electric motors, switched reluctance motors, induction motors, or any combination thereof. Alternatively or additionally, a motor may be driven by an inverter. A motor may also include electronic speed controllers, inverters, or other components for regulating motor speed, rotation direction, and/or dynamic braking.

Still referring to FIG. 6, plurality of actuators 608 may include an energy source. An energy source may include, for example, a generator, a photovoltaic device, a fuel cell such as a hydrogen fuel cell, direct methanol fuel cell, and/or solid oxide fuel cell, an electric energy storage device (e.g. a capacitor, an inductor, and/or a battery). An energy source may also include a battery cell, or a plurality of battery cells connected in series into a module and each module connected in series or in parallel with other modules. Configuration of an energy source containing connected modules may be designed to meet an energy or power requirement and may be designed to fit within a designated footprint in an electric aircraft in which system may be incorporated.

In an embodiment, and still referring to FIG. 6, an energy source may be used to provide a steady supply of electrical power to a load over a flight by an electric aircraft 600. For example, energy source may be capable of providing sufficient power for "cruising" and other relatively low-energy phases of flight. An energy source may also be capable of providing electrical power for some higher-power phases of flight as well, particularly when the energy source is at a high SOC, as may be the case for instance during takeoff. In an embodiment, energy source may include an emergency power unit which may be capable of providing sufficient electrical power for auxiliary loads including without limitation, lighting, navigation, communications, de-icing, steering or other systems requiring power or energy. Further, energy source may be capable of providing sufficient power for controlled descent and landing protocols, including, without limitation, hovering descent or runway landing. As used herein the energy source may have high power density where electrical power an energy source can usefully produce per unit of volume and/or mass is relatively high. As used in this disclosure, "electrical power" is a rate of electrical energy per unit time. An energy source may include a device for which power that may be produced per unit of volume and/or mass has been optimized, for instance at an expense of maximal total specific energy density or power capacity. Non-limiting examples of items that may be used as at least an energy source include batteries used for starting applications including Li ion batteries which may include NCA, NMC, Lithium iron phosphate (LiFePO4) and Lithium Manganese Oxide (LMO) batteries, which may be mixed with another cathode chemistry to provide more specific power if the application requires Li metal batteries, which have a lithium metal anode that provides high power on demand, Li ion batteries that have a silicon or titanite anode, energy source may be used, in an embodiment, to provide electrical power to an electric aircraft or drone, such as an electric aircraft vehicle, during moments requiring high rates of power output, including without limitation takeoff, landing, thermal de-icing and situations requiring greater power output for reasons of stability, such as high turbulence situations, as described in further detail below. A battery may include, without limitation a battery using nickel based chemistries such as nickel cadmium or nickel metal hydride, a battery using lithium ion battery chemistries such as a nickel cobalt aluminum (NCA), nickel manganese cobalt (NMC), lithium iron phosphate (LiFePO4), lithium cobalt oxide (LCO), and/or lithium manganese oxide (LMO), a battery using lithium polymer technology, lead-based batteries such as without limitation lead acid batteries, metal-air batteries, or any other suitable battery. Persons skilled in the art, upon reviewing the entirety of this disclosure, will be aware of various devices of components that may be used as an energy source.

Still referring to FIG. 6, an energy source may include a plurality of energy sources, referred to herein as a module of energy sources. Module may include batteries connected in parallel or in series or a plurality of modules connected either in series or in parallel designed to satisfy both power and energy requirements. Connecting batteries in series may increase a potential of at least an energy source which may provide more power on demand. High potential batteries may require cell matching when high peak load is needed. As more cells are connected in strings, there may exist a possibility of one cell failing which may increase resistance in module and reduce overall power output as voltage of the module may decrease as a result of that failing cell. Connecting batteries in parallel may increase total current capacity by decreasing total resistance, and it also may increase overall amp-hour capacity. Overall energy and power outputs of at least an energy source may be based on individual battery cell performance or an extrapolation based on a measurement of at least an electrical parameter. In an embodiment where energy source includes a plurality of battery cells, overall power output capacity may be dependent on electrical parameters of each individual cell. If one cell experiences high self-discharge during demand, power drawn from at least an energy source may be decreased to avoid damage to a weakest cell. Energy source may further include, without limitation, wiring, conduit, housing, cooling system and battery management system. Persons skilled in the art will be aware, after reviewing the entirety of this disclosure, of many different components of an energy source. Exemplary energy sources are disclosed in detail in U.S. patent application Ser. Nos. 16/948,157 and 16/048,140 both entitled "SYSTEM AND METHOD FOR HIGH ENERGY DENSITY BATTERY MODULE" by S. Donovan et al., which are incorporated in their entirety herein by reference.

Still referring to FIG. 6, according to some embodiments, an energy source may include an emergency power unit (EPU) (i.e., auxiliary power unit). As used in this disclosure an "emergency power unit" is an energy source as described herein that is configured to power an essential system for a critical function in an emergency, for instance without limitation when another energy source has failed, is depleted, or is otherwise unavailable. Exemplary non-limiting essential systems include navigation systems, such as MFD, GPS, VOR receiver or directional gyro, and other essential flight components, such as propulsors.

Still referring to FIG. 6, another exemplary actuator may include landing gear. Landing gear may be used for take-off and/or landing/Landing gear may be used to contact ground while aircraft 600 is not in flight. Exemplary landing gear is disclosed in detail in U.S. patent application Ser. No. 17/196,719 entitled "SYSTEM FOR ROLLING LANDING GEAR" by R. Griffin et al., which is incorporated in its entirety herein by reference.

Still referring to FIG. 6, aircraft 600 may include a pilot control 612, including without limitation, a hover control, a thrust control, an inceptor stick, a cyclic, and/or a collective control. As used in this disclosure a "collective control" or "collective" is a mechanical control of an aircraft that allows a pilot to adjust and/or control the pitch angle of the plurality of actuators 608. For example and without limitation, collective control may alter and/or adjust the pitch angle of all of the main rotor blades collectively. For example, and without limitation pilot control 612 may include a yoke control. As used in this disclosure a "yoke control" is a mechanical control of an aircraft to control the pitch and/or roll. For example and without limitation, yoke control may alter and/or adjust the roll angle of aircraft 600 as a function of controlling and/or maneuvering ailerons. In an embodiment, pilot control 612 may include one or more footbrakes, control sticks, pedals, throttle levels, and the like thereof. In another embodiment, and without limitation, pilot control 612 may be configured to control a principal axis of the aircraft. As used in this disclosure a "principal axis" is an axis in a body representing one three dimensional orientations. For example, and without limitation, principal axis or more yaw, pitch, and/or roll axis. Principal axis may include a yaw axis. As used in this disclosure a "yaw axis" is an axis that is directed towards the bottom of the aircraft, perpendicular to the wings. For example, and without limitation, a positive yawing motion may include adjusting and/or shifting the nose of aircraft 600 to the right. Principal axis may include a pitch axis. As used in this disclosure a "pitch axis" is an axis that is directed towards the right laterally extending wing of the aircraft. For example, and without limitation, a positive pitching motion may include adjusting and/or shifting the nose of aircraft 600 upwards. Principal axis may include a roll axis. As used in this disclosure a "roll axis" is an axis that is directed longitudinally towards the nose of the aircraft, parallel to the fuselage. For example, and without limitation, a positive rolling motion may include lifting the left and lowering the right wing concurrently.

Still referring to FIG. 6, pilot control 612 may be configured to modify a variable pitch angle. For example, and without limitation, pilot control 612 may adjust one or more angles of attack of a propeller. As used in this disclosure an "angle of attack" is an angle between the chord of the propeller and the relative wind. For example, and without limitation angle of attack may include a propeller blade angled 3.2°. In an embodiment, pilot control 612 may modify the variable pitch angle from a first angle of 2.71° to a second angle of 3.82°. Additionally or alternatively, pilot control 612 may be configured to translate a pilot desired torque for flight component 608. For example, and without limitation, pilot control 612 may translate that a pilot's desired torque for a propeller be 160 lb. ft. of torque. As a further non-limiting example, pilot control 612 may introduce a pilot's desired torque for a propulsor to be 290 lb. ft. of torque. Additional disclosure related to pilot control 612 may be found in U.S. patent application Ser. Nos. 17/001,845 and 16/929,206 both of which are entitled "A HOVER AND THRUST CONTROL ASSEMBLY FOR DUAL-MODE AIRCRAFT" by C. Spiegel et al., which are incorporated in their entirety herein by reference.

Still referring to FIG. 6, aircraft 600 may include a loading system. A loading system may include a system configured to load an aircraft of either cargo or personnel. For instance, some exemplary loading systems may include a swing nose, which is configured to swing the nose of aircraft 600 of the way thereby allowing direct access to a cargo bay located behind the nose. A notable exemplary swing nose aircraft is Boeing 747. Additional disclosure related to loading systems can be found in U.S. patent application Ser. No. 17/137,594 entitled "SYSTEM AND METHOD FOR LOADING AND SECURING PAYLOAD IN AN AIRCRAFT" by R. Griffin et al., entirety of which in incorporated herein by reference.

Still referring to FIG. 6, aircraft 600 may include a sensor 616. Sensor 616 may include any sensor or noise monitoring circuit described in this disclosure, for instance in reference to FIGS. 1-6. Sensor 616 may be configured to sense a characteristic of pilot control 612. Sensor may be a device, module, and/or subsystem, utilizing any hardware, software, and/or any combination thereof to sense a characteristic and/or changes thereof, in an instant environment, for instance without limitation a pilot control 612, which the sensor is proximal to or otherwise in a sensed communication with, and transmit information associated with the characteristic, for instance without limitation digitized data.

Sensor 616 may be mechanically and/or communicatively coupled to aircraft 1200, including, for instance, to at least a pilot control 612. Sensor 616 may be configured to sense a characteristic associated with at least a pilot control 612. An environmental sensor may include without limitation one or more sensors used to detect ambient temperature, barometric pressure, and/or air velocity, one or more motion sensors which may include without limitation gyroscopes, accelerometers, inertial measurement unit (IMU), and/or magnetic sensors, one or more humidity sensors, one or more oxygen sensors, or the like. Additionally or alternatively, sensor 616 may include at least a geospatial sensor. Sensor 616 may be located inside an aircraft; and/or be included in and/or attached to at least a portion of the aircraft. Sensor may include one or more proximity sensors, displacement sensors, vibration sensors, and the like thereof. Sensor may be used to monitor the status of aircraft 600 for both critical and non-critical functions. Sensor may be incorporated into vehicle or aircraft or be remote.

Still referring to FIG. 6, in some embodiments, sensor 616 may be configured to sense a characteristic associated with any pilot control described in this disclosure. Non-limiting examples of a sensor 616 may include an inertial measurement unit (IMU), an accelerometer, a gyroscope, a proximity sensor, a pressure sensor, a light sensor, a pitot tube, an air speed sensor, a position sensor, a speed sensor, a switch, a thermometer, a strain gauge, an acoustic sensor, and an electrical sensor. In some cases, sensor 616 may sense a characteristic as an analog measurement, for instance, yielding a continuously variable electrical potential indicative of the sensed characteristic. In these cases, sensor 616 may additionally comprise an analog to digital converter (ADC) as well as any additionally circuitry, such as without limitation a Whetstone bridge, an amplifier, a filter, and the like. For instance, in some cases, sensor 616 may comprise a strain gage configured to determine loading of one or flight components, for instance landing gear. Strain gage may be included within a circuit comprising a Whetstone bridge, an amplified, and a bandpass filter to provide an analog strain measurement signal having a high signal to noise ratio, which characterizes strain on a landing gear member. An ADC may then digitize analog signal produces a digital signal that can then be transmitted other systems within aircraft 600, for instance without limitation a computing system, a pilot display, and a memory component. Alternatively or additionally, sensor 616 may sense a characteristic of a pilot control 612 digitally. For instance in some embodiments, sensor 616 may sense a characteristic through a digital means or digitize a sensed signal natively. In some cases, for example, sensor 616 may include a rotational encoder and be configured to sense a rotational position of a pilot control; in this case, the rotational encoder digitally may sense rotational "clicks" by any known method, such as without limitation magnetically, optically, and the like.

Still referring to FIG. 6, electric aircraft 600 may include at least a motor 624, which may be mounted on a structural feature of the aircraft. Design of motor 624 may enable it to be installed external to structural member (such as a boom, nacelle, or fuselage) for easy maintenance access and to minimize accessibility requirements for the structure; this may improve structural efficiency by requiring fewer large holes in the mounting area. In some embodiments, motor 624 may include two main holes in top and bottom of mounting area to access bearing cartridge. Further, a structural feature may include a component of electric aircraft 600. For example, and without limitation structural feature may be any portion of a vehicle incorporating motor 1324, including any vehicle as described in this disclosure. As a further non-limiting example, a structural feature may include without limitation a wing, a spar, an outrigger, a fuselage, or any portion thereof; persons skilled in the art, upon reviewing the entirety of this disclosure, will be aware of many possible features that may function as at least a structural feature. At least a structural feature may be constructed of any suitable material or combination of materials, including without limitation metal such as aluminum, titanium, steel, or the like, polymer materials or composites, fiberglass, carbon fiber, wood, or any other suitable material. As a non-limiting example, at least a structural feature may be constructed from additively manufactured polymer material with a carbon fiber exterior; aluminum parts or other elements may be enclosed for structural strength, or for purposes of supporting, for instance, vibration, torque, or shear stresses imposed by at least propulsor 608. Persons skilled in the art, upon reviewing the entirety of this disclosure, will be aware of various materials, combinations of materials, and/or constructions techniques.

Still referring to FIG. 6, electric aircraft 600 may include a vertical takeoff and landing aircraft (eVTOL). As used herein, a vertical take-off and landing (eVTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate life caused by the aircraft's forward airspeed and the shape of the wings and/or foils, such as airplane-style flight.

With continued reference to FIG. 6, a number of aerodynamic forces may act upon the electric aircraft 600 during flight. Forces acting on electric aircraft 600 during flight may include, without limitation, thrust, the forward force produced by the rotating element of the electric aircraft 600 and acts parallel to the longitudinal axis. Another force acting upon electric aircraft 600 may be, without limitation, drag, which may be defined as a rearward retarding force which is caused by disruption of airflow by any protruding surface of the electric aircraft 600 such as, without limitation, the wing, rotor, and fuselage. Drag may oppose thrust and acts rearward parallel to the relative wind. A further force acting upon electric aircraft 600 may include, without limitation, weight, which may include a combined load of the electric aircraft 600 itself, crew, baggage, and/or fuel. Weight may pull electric aircraft 600 downward due to the force of gravity. An additional force acting on electric aircraft 600 may include, without limitation, lift, which may act to oppose the downward force of weight and may be produced by the dynamic effect of air acting on the airfoil and/or downward thrust from the propulsor 608 of the electric aircraft. Lift generated by the airfoil may depend on speed of airflow, density of air, total area of an airfoil and/or segment thereof, and/or an angle of attack between air and the airfoil. For example, and without limitation, electric aircraft 600 are designed to be as lightweight as possible.

Reducing the weight of the aircraft and designing to reduce the number of components is essential to optimize the weight. To save energy, it may be useful to reduce weight of components of electric aircraft 600, including without limitation propulsors and/or propulsion assemblies. In an embodiment, motor 1224 may eliminate need for many external structural features that otherwise might be needed to join one component to another component. Motor 1224 may also increase energy efficiency by enabling a lower physical propulsor profile, reducing drag and/or wind resistance. This may also increase durability by lessening the extent to which drag and/or wind resistance add to forces acting on electric aircraft 600 and/or propulsors.

Figure 7:
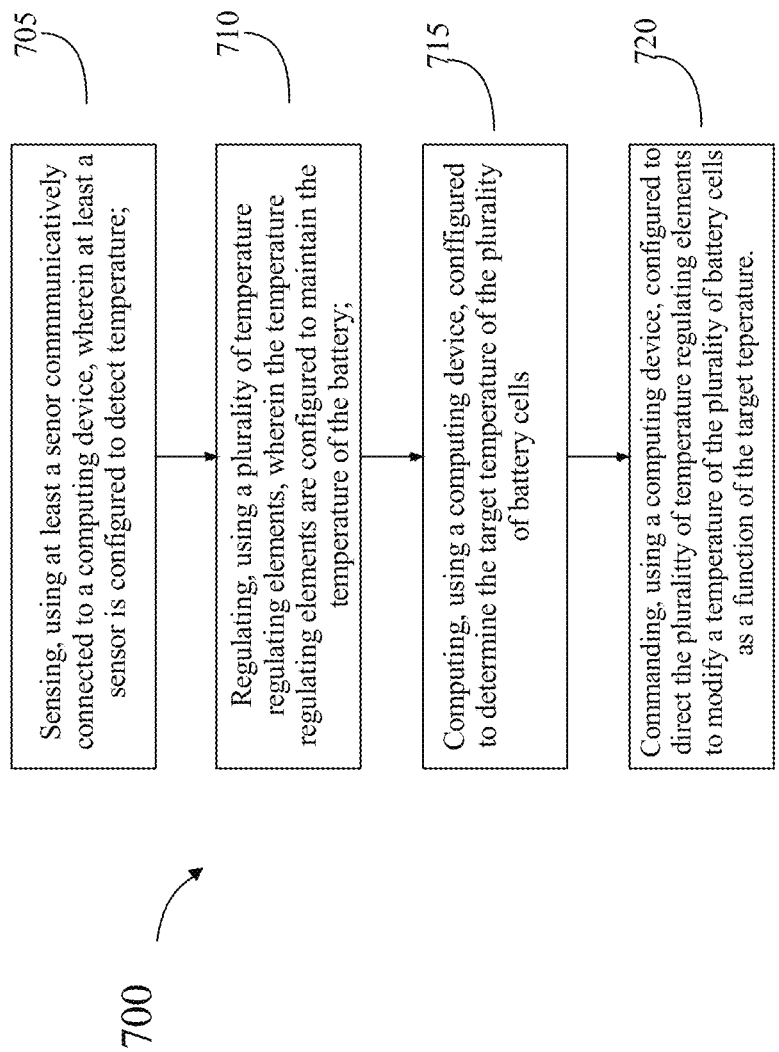
FIG. 7 is a flow diagram of an exemplary embodiment of a method for a battery system with spring conductors of an electric aircraft.

Referring now to FIG. 7, an exemplary method 700 for a system for battery temperature management in an electric aircraft. At step 705, method 700 may include sensing using at least a sensor communicatively connected to a computing device, wherein at least a sensor is configured to detect temperature. A sensor may include any sensor described in in this disclosure, for example with reference to FIGS. 1-8.

With continued reference to FIG. 7, at step 710, method 700 may include regulating using a plurality of temperature regulating elements, wherein the temperature regulating elements are configured to maintain the temperature of the battery pack. A temperature regulating element may include any temperature regulating element described in in this disclosure, for example with reference to FIGS. 1-8. A battery pack may include any battery described in in this disclosure, for example with reference to FIGS. 1-8.

With continued reference to FIG. 7, at step 715, method 700 may include computing using a computing device, configured to determine the target temperature of the plurality of battery cells. A computing device may include any computing device described in in this disclosure, for example with reference to FIGS. 1-8. A battery cell may include any battery described in in this disclosure, for example with reference to FIGS. 1-8.

With continued reference to FIG. 7, at step 715, method 700 may include commanding using a computing device, configured to direct the plurality of temperature regulating elements to modify a temperature of the plurality of battery cells as a function of the target temperature.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 8:
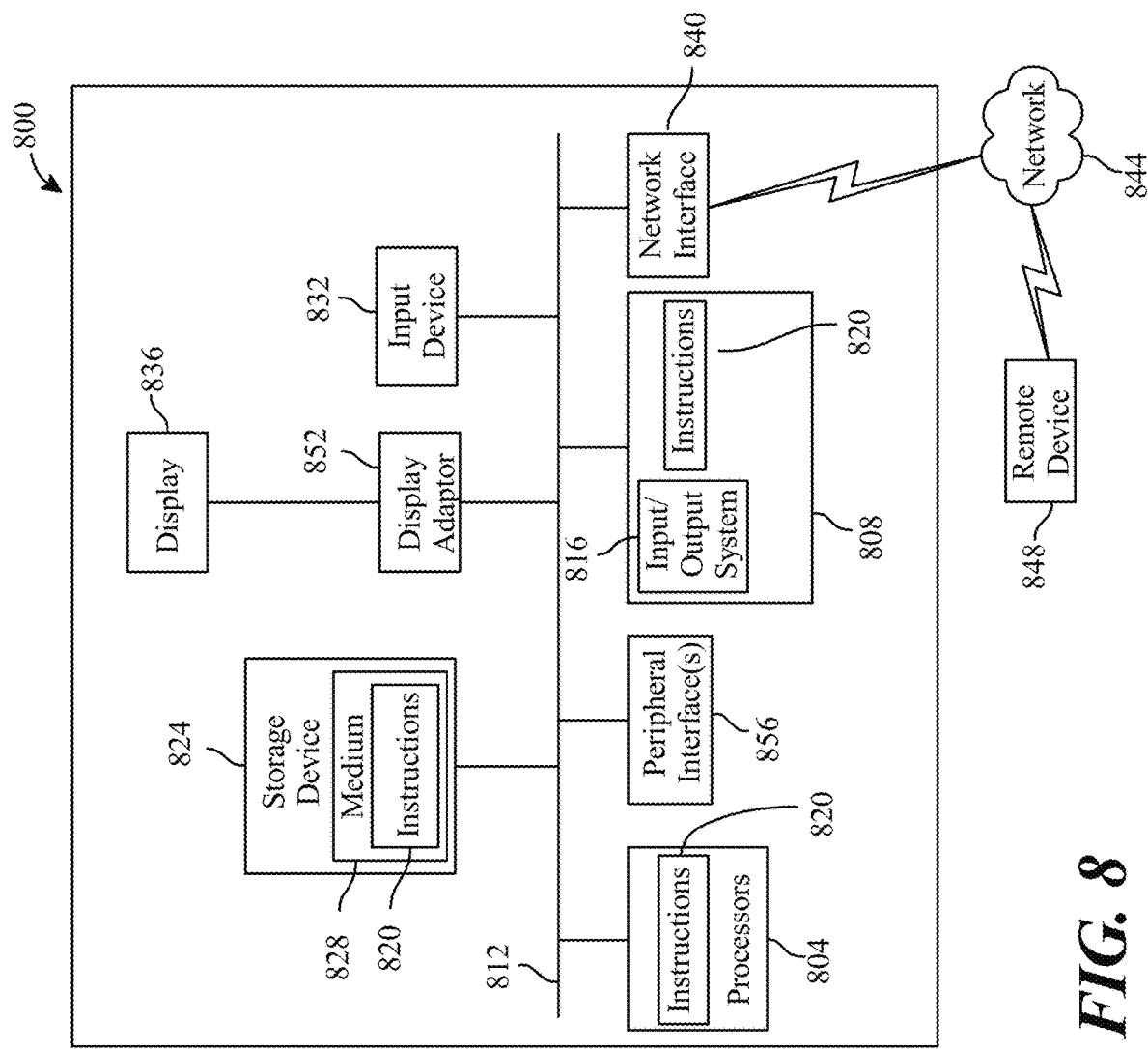
FIG. 8 is a block diagram of a computing system that can be used to implement any one or more of the methodologies disclosed herein and any one or more portions thereof.

FIG. 8 shows a diagrammatic representation of one embodiment of a computing device in the exemplary form of a computer system 800 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 800 includes a processor 804 and a memory 808 that communicate with each other, and with other components, via a bus 812. Bus 812 may include any of several types of bus structures including, but not limited to, a memory bus, a memory controller, a peripheral bus, a local bus, and any combinations thereof, using any of a variety of bus architectures.

Processor 804 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 804 may be organized according to Von Neumann and/or Harvard architecture as a non-limiting example. Processor 804 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 808 may include various components (e.g., machine-readable media) including, but not limited to, a random-access memory component, a read only component, and any combinations thereof. In one example, a basic input/output system 816 (BIOS), including basic routines that help to transfer information between elements within computer system 800, such as during start-up, may be stored in memory 808. Memory 808 may also include (e.g., stored on one or more machine-readable media) instructions (e.g., software) 820 embodying any one or more of the aspects and/or methodologies of the present disclosure. In another example, memory 808 may further include any number of program modules including, but not limited to, an operating system, one or more application programs, other program modules, program data, and any combinations thereof.

Computer system 800 may also include a storage device 824. Examples of a storage device (e.g., storage device 824) include, but are not limited to, a hard disk drive, a magnetic disk drive, an optical disc drive in combination with an optical medium, a solid-state memory device, and any combinations thereof. Storage device 824 may be connected to bus 812 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 824 (or one or more components thereof) may be removably interfaced with computer system 800 (e.g., via an external port connector (not shown)). Particularly, storage device 824 and an associated machine-readable medium 828 may provide nonvolatile and/or volatile storage of machine-readable instructions, data structures, program modules, and/or other data for computer system 800. In one example, software 820 may reside, completely or partially, within machine-readable medium 828. In another example, software 820 may reside, completely or partially, within processor 804.

Computer system 800 may also include an input device 832. In one example, a user of computer system 800 may enter commands and/or other information into computer system 800 via input device 832. Examples of an input device 832 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 832 may be interfaced to bus 812 via any of a variety of interfaces (not shown) including, but not limited to, a serial interface, a parallel interface, a game port, a USB interface, a FIRE-WIRE interface, a direct interface to bus 812, and any combinations thereof. Input device 832 may include a touch screen interface that may be a part of or separate from display 836, discussed further below. Input device 832 may be utilized as a user selection device for selecting one or more graphical representations in a graphical interface as described above.

A user may also input commands and/or other information to computer system 800 via storage device 824 (e.g., a removable disk drive, a flash drive, etc.) and/or network interface device 840. A network interface device, such as network interface device 840, may be utilized for connecting computer system 800 to one or more of a variety of networks, such as network 844, and one or more remote devices 848 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 844, may employ a wired and/or a wireless mode of communication. In general, any network topology may be used. Information (e.g., data, software 820, etc.) may be communicated to and/or from computer system 800 via network interface device 840.

Computer system 800 may further include a video display adapter 852 for communicating a displayable image to a display device, such as display device 836. Examples of a display device include, but are not limited to, a liquid crystal display (LCD), a cathode ray tube (CRT), a plasma display, a light emitting diode (LED) display, and any combinations thereof. Display adapter 852 and display device 836 may be utilized in combination with processor 804 to provide graphical representations of aspects of the present disclosure. In addition to a display device, computer system 800 may include one or more other peripheral output devices including, but not limited to, an audio speaker, a printer, and any combinations thereof. Such peripheral output devices may be connected to bus 812 via a peripheral interface 856. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for battery temperature management in an electric aircraft, wherein the system comprises:
    a plurality of battery cells, wherein the battery cells are comprised of pouch cells;
    at least a sensor communicatively connected to a computing device, wherein the at least a sensor is configured to collect a temperature datum of the plurality of battery cells;
    a plurality of temperature regulating elements disposed between the plurality of pouch cells, wherein the plurality of temperature regulating elements are configured to regulate a temperature of the plurality of battery cells, wherein at least one temperature regulating element comprises a heating element including a sheet heater, wherein the sheet heater comprises a resistive film wrapped around a pouch cell of the plurality of pouch cells; and a computing device communicatively connected to the plurality of temperature regulating elements, wherein the computing device is configured to:

determine a target temperature of the plurality of battery cells as a function of a flight plan and battery considerations, wherein the target temperature is further determined as a function of wind speed;

determine the temperature of the plurality of battery cells by comparing the temperature datum to the target temperature;

send a notification of the temperature of the plurality of battery cells to a user interface; and direct the plurality of temperature regulating elements to modify the temperature of the plurality of battery cells as a function of the target temperature.

2. The system of claim 1, wherein each cell of the plurality of cells has a prismatic shape.

3. The system of claim 1, wherein each temperature regulating element of the plurality of temperature regulating elements includes a cooling element.

4. The system of claim 1, wherein each temperature regulating element of the plurality of temperature regulating elements is located within gaps between adjacent battery cells.

5. The system of claim 1, wherein a computing device is further configured to determine the target temperature as a function of the weather.

6. The system of claim 1, wherein a computing device is further configured to determine the target temperature as a function of the state of charge of the battery.

7. The system of claim 6, wherein calculating the target temperature is a function of a location of a charging station as it relates to a current charge of the battery.

8. The system of claim 1, wherein at least a sensor is configured to detect the current temperature.

9. A method of use for a system for battery temperature management in an electric aircraft, where in the method comprises:

storing, using a plurality of battery cells, wherein the battery cells are comprised of pouch cells;

sensing, using at least a sensor communicatively connected to a computing device, wherein the at least a sensor is configured to collect a temperature datum of the plurality of battery cells;

regulating, using a plurality of temperature regulating elements, wherein the temperature regulating elements are configured to regulate a temperature of the plurality of battery cells, wherein at least one temperature regulating element comprises a heating element including a sheet heater, wherein the sheet heater comprises a resistive film wrapped around a pouch cell of the plurality of pouch cells;

computing, using a computing device, configured to determine a target temperature of the plurality of battery cells as a function of a flight plan and battery considerations, wherein the target temperature is further determined as a function of wind speed;

determining, using the computing device, the temperature of the plurality of battery cells by comparing the temperature datum to the target temperature;

sending, using the computing device, a notification of the temperature of the plurality of battery cells to a user interface; and commanding, using a computing device, configured to direct the plurality of temperature regulating elements to modify a temperature of the plurality of battery cells as a function of the target temperature.

10. The method of claim 9, wherein each cell of the plurality of cells has a prismatic shape.

11. The method of claim 9, wherein each temperature regulating element of the plurality of temperature regulating elements includes a cooling element.

12. The method of claim 9 wherein each temperature regulating element of the plurality of temperature regulating elements is located within gaps between adjacent battery cells.

13. The method of claim 9 wherein a computing device is further configured to determine the target temperature as a function of the weather.

14. The method of claim 9, wherein a computing device is further configured to determine the target temperature as a function of the state of charge of the battery.

15. The method of claim 11, wherein at least a sensor is configured to detect the current temperature.

* * * * *